(12) United States Patent
Yonekura et al.

(10) Patent No.: US 11,590,650 B2
(45) Date of Patent: Feb. 28, 2023

(54) GENERATION METHOD FOR TRAINING DATASET, MODEL GENERATION METHOD, TRAINING DATA GENERATION APPARATUS, INFERENCE APPARATUS, ROBOTIC CONTROLLER, MODEL TRAINING METHOD AND ROBOT

(71) Applicant: Preferred Networks, Inc., Tokyo (JP)

(72) Inventors: Kenta Yonekura, Tokyo (JP); Kuniyuki Takahashi, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 247 days.

(21) Appl. No.: 16/895,233

(22) Filed: Jun. 8, 2020

(65) Prior Publication Data

US 2020/0384640 A1 Dec. 10, 2020

(30) Foreign Application Priority Data

Jun. 10, 2019 (JP) .............................. JP2019-108219
Sep. 10, 2019 (JP) .............................. JP2019-164343
Mar. 6, 2020 (JP) .............................. JP2020-039132

(51) Int. Cl.
*G06T 7/73* (2017.01)
*B25J 9/16* (2006.01)
*B25J 19/02* (2006.01)

(52) U.S. Cl.
CPC .............. *B25J 9/163* (2013.01); *B25J 9/1669* (2013.01); *B25J 19/023* (2013.01); *G06T 7/74* (2017.01);
(Continued)

(58) Field of Classification Search
CPC ........ B25J 9/163; B25J 9/1669; B25J 19/023; B25J 9/1697; G06T 7/74;
(Continued)

(56) References Cited

U.S. PATENT DOCUMENTS

2007/0047940 A1* 3/2007 Matsumoto ............ G01C 25/00
396/106
2010/0035253 A1* 2/2010 Gordon .................. G16B 25/00
435/6.11
(Continued)

FOREIGN PATENT DOCUMENTS

JP S64-4881 1/1989
JP H06-52345 2/1994
(Continued)

OTHER PUBLICATIONS

Y. Kita, F. Kanehiro, T. Ueshiba, N. Kita: "Strategy for Folding Clothing on the Basis of Deformable Models", ICIAR 2014, p. 442-452, 2014.
(Continued)

*Primary Examiner* — Ali Bayat
(74) *Attorney, Agent, or Firm* — IPUSA, PLLC

(57) ABSTRACT

One aspect of the present disclosure relates to a generation method for a training dataset, comprising: capturing, by one or more processors, a target object to which a marker unit recognizable under a first illumination condition is provided; and acquiring, by the one or more processors, a first image where the marker unit is recognizable and a second image obtained by capturing the target object under a second illumination condition.

20 Claims, 15 Drawing Sheets

(52) U.S. Cl.
CPC .............. *G06T 2207/10064* (2013.01); *G06T 2207/10152* (2013.01); *G06T 2207/30204* (2013.01)

(58) Field of Classification Search
CPC . G06T 2207/10064; G06T 2207/10152; G06T 2207/30204; G06T 2207/10024; G06T 2207/20081; G06T 2207/20084; G06T 2207/30124
USPC ....................................................... 382/103
See application file for complete search history.

(56) References Cited

U.S. PATENT DOCUMENTS

| | | | | |
|---|---|---|---|---|
| 2013/0050426 | A1* | 2/2013 | Sarmast | H04N 13/133 348/E13.064 |
| 2014/0267672 | A1* | 9/2014 | Morrison | G01N 21/6458 348/79 |
| 2017/0120518 | A1* | 5/2017 | DeMuth | B23K 26/142 |
| 2019/0200977 | A1* | 7/2019 | Shelton, IV | A61B 17/068 |
| 2020/0296266 | A1* | 9/2020 | Koyama | H04N 5/2257 |

FOREIGN PATENT DOCUMENTS

| | | |
|---|---|---|
| JP | H09-160996 | 6/1997 |
| JP | 2000-057249 | 2/2000 |
| JP | 2007-193387 | 8/2007 |
| JP | 2013-254265 | 12/2013 |

OTHER PUBLICATIONS

Kuniyuki Takahashi et al., "Invisible Marker: Automatic Annotation of Segmentation Masks for Object Manipulation", [online] Sep. 27, 2019, [last revised] Mar. 9, 2020<URL:https://arxiv.org/abs/1909.12493>.

Kuniyuki Takahashi et al., "Invisible Marker: Automatic Annotation for Object Manipulation", published on Sep. 27, 2019,<URL:https://www.youtube.com/watch?v=n6idIG3T0xl&feature=youtu.be>.

Simon Baker et al., "A Database and Evaluation Methodology for Optical Flow", Int J Comput Vis (2011) 92: 1-31, DOI 10.1007/s11263-010-0390-2.

Kenta Yonekura et al., "Invisible Marker: Automatic Generation Scheme of Training Dataset Using Fluorescent Paint for Deep Learning", 37th Annual Conference of the Robotics Society of Japan, Sep. 4, 2019.

Kenta Yonekura et al., "Invisible Marker: Automatic Annotation for Semantic Segmentation", International Symposium on Machine Intelligence for Future Society 2019 in Japan, Sep. 9, 2019.

Kuniyuki Takahashi et al., "Invisible Marker: Automatic Annotation for Object Manipulation", published on Sep. 27, 2019.

Jeremy Maitin-Shepard et al., Department of Electrical Engineering and Computer Science, University of California, Berkeley, "Cloth Grasp Point Detection based on Multiple-View Geometric Cues with Application to Robotic Towel Folding", Mar. 17, 2010, <https://www.youtube.com/watch?v=gy5g33S0Gzo>.

Yusuke Nakazato et al., Nara Institute of Science and Technology, "A Localization Method Using Retro-reflective Markers and an IR camera", Jul. 15, 2004, retrieved from <http://yokoya.naist.jp/paper/datas/738/mve0407nakazato.pdf>.

Kuniyuki Takahashi et al., Preferred Networks,Inc., "Invisible Marker: Automatic Annotation for Object Manipulation", arXiv:1909.12493v1 [cs.RO] Sep. 27, 2019, <https://arxiv.org/pdf/1909.12493v1.pdf>.

Kuniyuki Takahashi et al., Preferred Networks,Inc., "Invisible Marker: Automatic Annotation of Segmentation Masks for Object Manipulation", arXiv:1909.12493v2 [cs.RO] Mar. 9, 2020, <https://arxiv.org/pdf/1909.12493v2.pdf>.

* cited by examiner

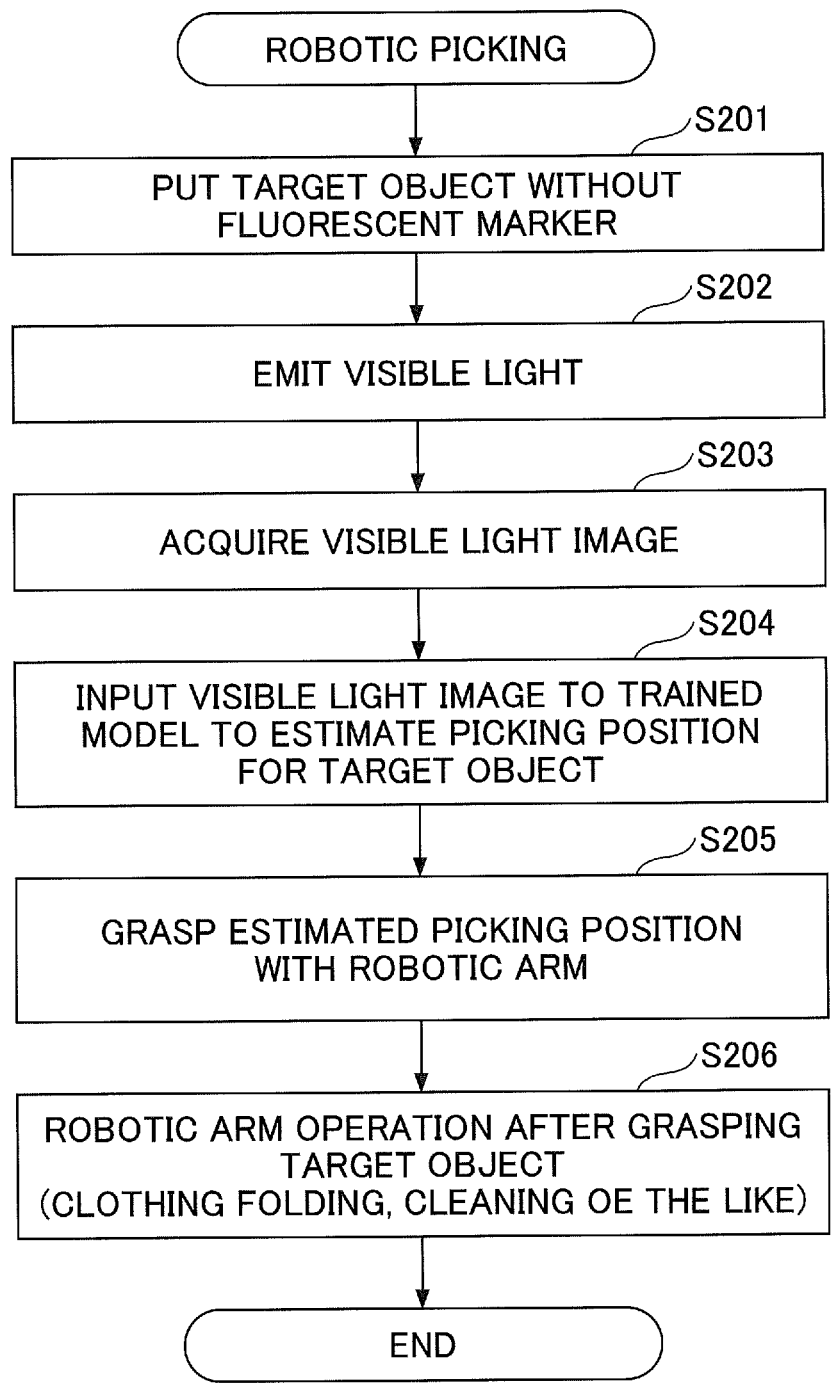

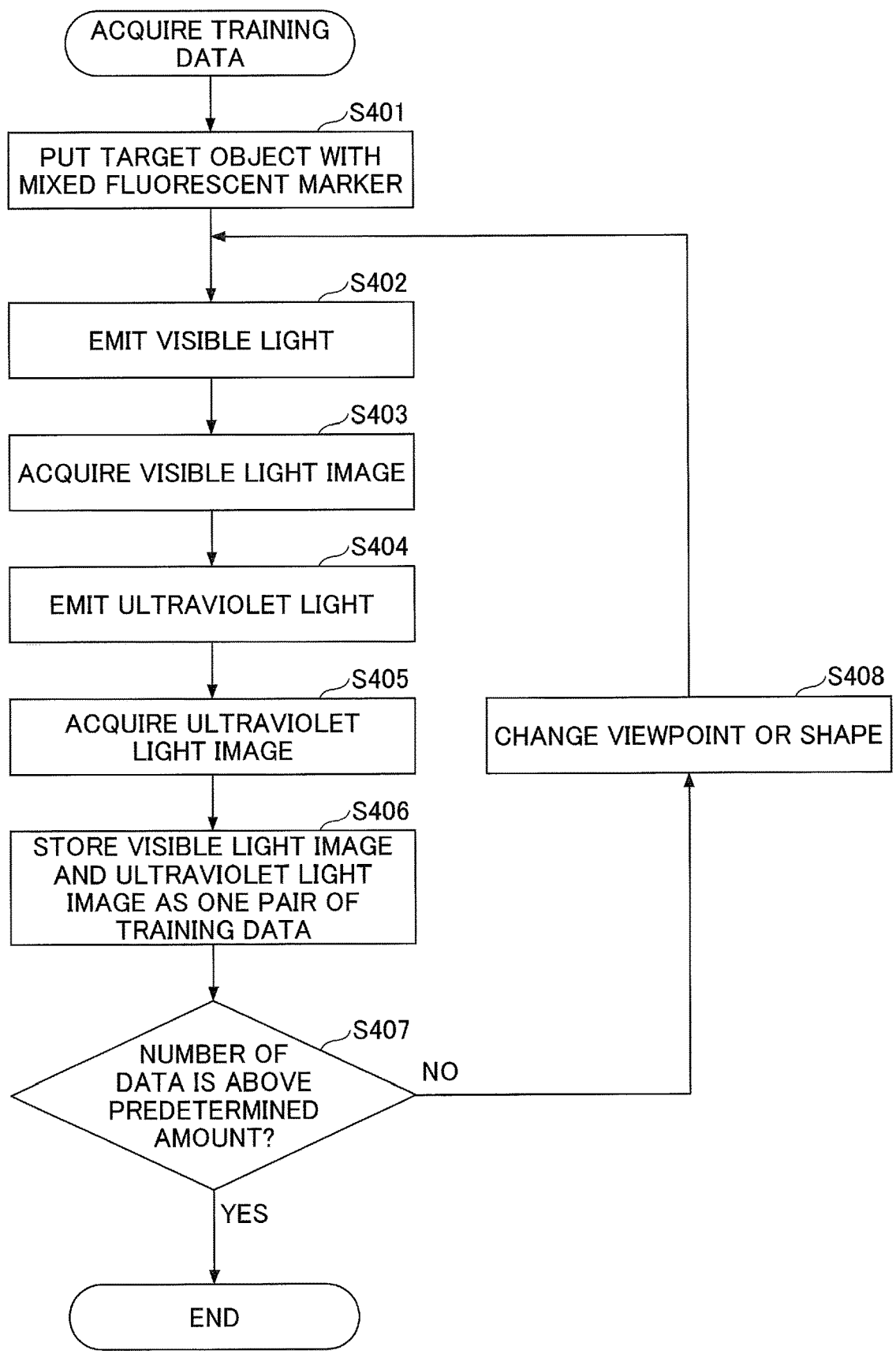

GENERATION METHOD FOR TRAINING DATASET, MODEL GENERATION METHOD, TRAINING DATA GENERATION APPARATUS, INFERENCE APPARATUS, ROBOTIC CONTROLLER, MODEL TRAINING METHOD AND ROBOT

CROSS-REFERENCE TO RELATED APPLICATIONS

The present application is based on and claims priority to JP applications No. 2019-108219 filed on Jun. 10, 2019, No. 2019-164343 filed on Sep. 10, 2019, and No. 2020-039132 filed on Mar. 6, 2020 with the Japan Patent Office, the entire contents of which are hereby incorporated by reference.

BACKGROUND

1. Technical Field

The disclosure herein relates to a generation method for a training dataset, a model generation method, a generation apparatus for training data, an inference apparatus, a robotic controller, a model training method and a robot.

2. Description of the Related Art

Research for causing a robot to perform situation recognition and action selection based on image information is being conducted.

For example, a technique is proposed for enabling a dual-arm robot to grasp picking points suitable for folding, through iterations of picking up one point of a clothing placed in a random fashion, estimating its three-dimensional shape and switching the clothing with the dual arms (see Y. Kita, F. Kanehiro, T. Ueshiba, N. Kita: "Strategy for Folding Clothing on the Basis of Deformable Models", ICIAR 2014, p. 442-452, 2014, for example).

SUMMARY

One aspect of the present disclosure relates to a generation method for a training dataset, comprising: capturing, by one or more processors, a target object to which a marker unit recognizable under a first illumination condition is provided; and acquiring, by the one or more processors, a first image where the marker unit is recognizable and a second image obtained by capturing the target object under a second illumination condition.

BRIEF DESCRIPTION OF THE DRAWINGS

Other objects and further features of the present disclosure will be apparent from the following detailed description when read in conjunction with the accompanying drawings, in which:

FIG. 6 is a flowchart of robotic picking control according to the first embodiment;

FIG. 10 is a flowchart of a training data acquisition operation according to the third embodiment;

DETAILED DESCRIPTION

Embodiments are described below with reference to the accompanying drawings. In order to facilitate understandings of descriptions, the same reference symbols are attached to the same components in the figures if possible, and duplicated descriptions are omitted.

According to conventional schemes, it is difficult to estimate the three-dimensional shape of a flexible object such as a clothing based on image information. Accordingly, there is a need of a novel object recognition technique based on the image information.

First Embodiment

Figure 1:
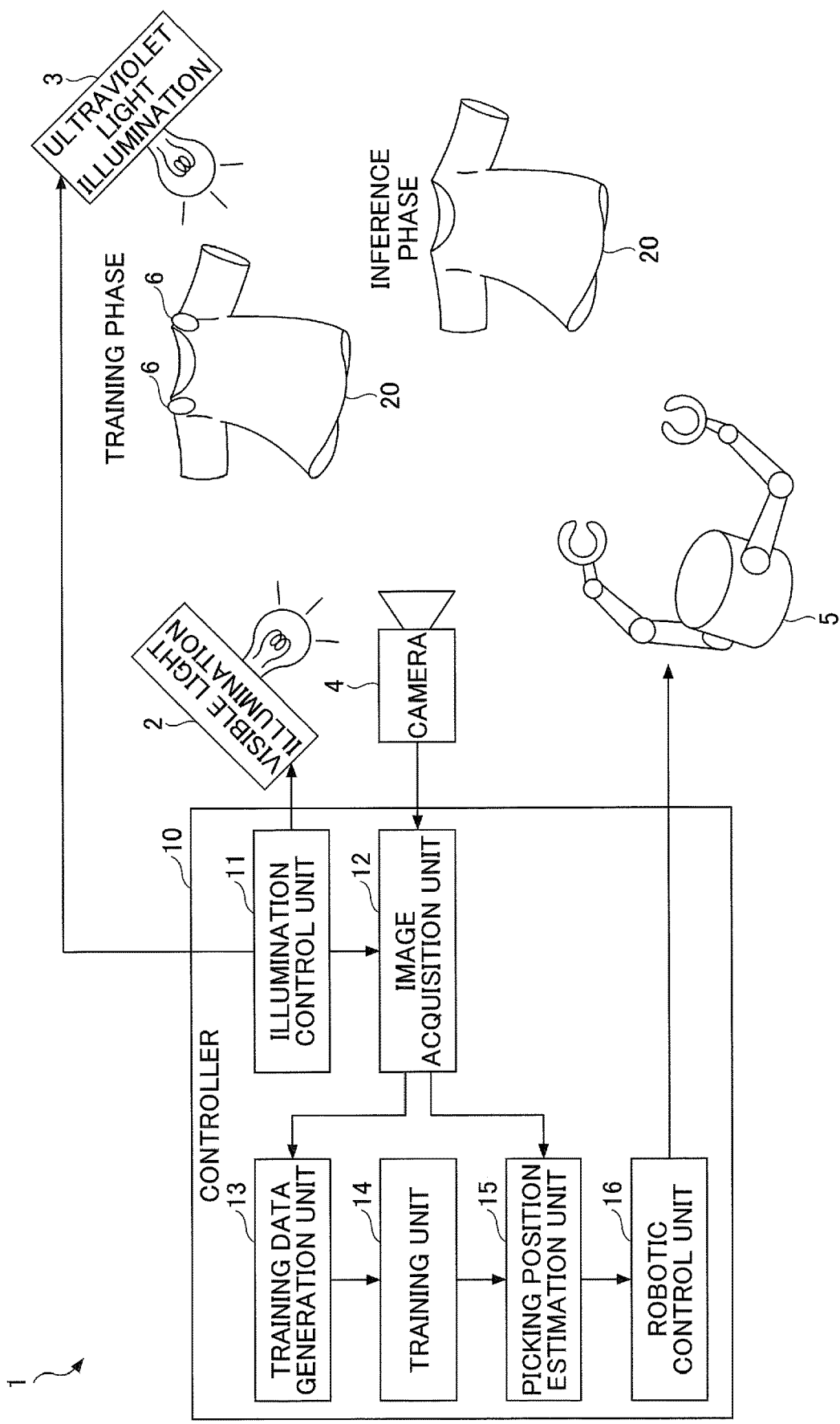
FIG. 1 is a functional block diagram of a robotic controller according to a first embodiment.

The first embodiment is described with reference to FIGS. 1 to 6. FIG. 1 is a functional block diagram of a robotic controller 1 according to the first embodiment.

The robotic controller 1 illustrated in FIG. 1 is an apparatus for controlling robotic operations associated with a target object 20. Information of a light emitting unit that is provided in the target object 20 and emits light by illumination of ultraviolet light (one instance of invisible light) is used as a measure of determining operations of a robot. Note that the "light emission" herein may be any type of light emission that can be recognized by a visual system of the robot and may be unnecessarily visible to human beings around the robot.

Particularly, according to the first embodiment, a robotic operation is a picking operation for picking the target object 20 such as a clothing or a mug with dual robotic arms 5 having multiple degrees of freedom. Also, according to the first embodiment, a fluorescent marker 6 is provided at a picking position of the target object 20 as the light emitting unit or is used to indicate information on the picking position. The fluorescent marker 6 according to the present embodiment is invisible to a wavelength of a visible light range and is formed of materials that upon receiving invisible light such as ultraviolet light, emit the light at the wavelength of the visible light range. Accordingly, the fluorescent marker 6 may have an appearance that does not hinder determination of a texture of the target object 20 or does not matter to a user such as a transparent object or a white object nearly to transparent under observation with the visible light.

Note that the fluorescent marker 6 may not be invisible (transparent, white or the like) to the wavelength of the visible light range depending on a condition of a to-be-generated training dataset, a usage condition or the like. Also, the invisible light is not limited to being invisible and may be anything that can make the manner of how the fluorescent marker 6 looks like variable. In this case, in the present disclosure, the visible light may be replaced with light of a first wavelength, and the invisible or ultraviolet light may be replaced with light of a second wavelength.

In other words, what is visually changeable between emissions of the first light and the second light is available as the fluorescent marker 6. The visual change includes a change in colors, a change in contrast with portions other than the fluorescent marker 6 or the like, for example. Specifically, if a phosphor for absorbing blue light and emitting yellow light is used as a fluorescent substance included in the fluorescent marker 6, the fluorescent marker 6 looks like pale yellow under the visible light of the first wavelength and white or the like under emission of the blue light of the second wavelength. In this manner, the fluorescent marker 6 varies visually.

Also, the terminology "fluorescent" herein includes fluorescent and phosphorescent.

In addition, if the target object 20 is the clothing as illustrated in FIG. 1, some tasks of folding the clothing from the state of picking the clothing in a picking operation in a predetermined procedure may be included in operations executed by a robot. In this case, for example, multiple types of the fluorescent markers 6 that emit the light with different colors may be provided to the clothing 20, and the folding operation can be performed in the predetermined procedure by changing the picking position of the clothing 20 with robotic arms in the order configured by emitting color information.

The robotic controller 1 can determine a robotic action based on image information regarding the target object 20 captured with a camera 4. Machine learning can be used to determine the robotic actions. As illustrated in FIG. 1, the fluorescent marker 6 is attached to the position (picking position) on the target object 20 picked by the robot during training, and machine learning is performed by using images obtained by capturing the fluorescent marker 6. However, the fluorescent marker 6 on the target object may not be required for controlling the robot after completing the machine learning. This is because the trained model can be used to estimate the picking position indicated by the fluorescent marker 6 from the image information of only the target object 20.

As illustrated in FIG. 1, the robotic controller 1 has a visible light illumination 2, an ultraviolet light illumination 3, a camera 4, a robotic arm 5 and a controller 10.

The visible light illumination 2 (one instance of a visible light illumination unit) emits visible light to the target object 20. The ultraviolet light illumination 3 (one instance of an invisible light illumination unit) emits invisible light to the target object 20. The fluorescent marker 6 provided to the target object 20 can emit the light with emission of the ultraviolet light by the ultraviolet light illumination 3. Note that the ultraviolet light illumination 3 may have any arrangement to emit the light of wavelengths other than the ultraviolet light as long as it can emit the invisible light that the fluorescent marker 6 can be emit light by the invisible light. Also, the light emitted with the ultraviolet light illumination 3 is not limited to being completely invisible to human beings or cameras and may partially include the wavelength of the visible light range.

The camera 4 (one instance of a capturing unit) captures the target object 20.

In the present embodiment, the robotic arm 5 performs picking operations on the target object 20. The robotic arm 5 may be a robotic arm of multiple degrees of freedom such as seven degrees of freedom, for example, and the tip of arm can be moved to any position and direction. Also, robotic hands that can grasp the target object 20 may be provided as end effectors to the tip of the robotic arm 5, for example. The robotic arm 5 can operate respective parts depending on operating instructions fed out from the controller 10. Note that although the robotic arm 5 may be dual arms or a single arm, it preferably may be the dual arms in the case where the flexible target object 20 according to the present embodiment is handled.

The controller 10 controls whole robotic operations. The controller 10 according to the present embodiment has an illumination control unit 11, an image acquisition unit 12, a training data generation unit 13, a training unit 14, a picking position estimation unit 15 and a robotic control unit 16 in conjunction with the robotic control.

The illumination control unit 11 controls illumination timings of the visible light illumination 2 and the ultraviolet light illumination 3. Specifically, the illumination control unit 11 can switch between the illumination of the visible light to the target object 20 with the visible light illumination 2 and the illumination of the ultraviolet light to the target object 20 with the ultraviolet light illumination 3 in a predetermined timing.

The image acquisition unit 12 acquires an image of the target object 20 captured with the camera 4. The image acquisition unit 12 according to the present embodiment receives switch timing information for the visible light illumination 2 and the ultraviolet light illumination 3 from the illumination control unit 11. The image acquisition unit 12 alternately acquires a visible light image 31 (see FIGS. 5 and 6) captured with the camera 4 in a state of the visible light being emitted to the target object 20, and an ultraviolet light image (invisible light image) (see FIGS. 5 and 6) in a state of the ultraviolet light being emitted to the target object 20 to lighten the fluorescent marker 6 during switching the illuminations under the illumination control unit 11.

The training data generation unit 13 acquires pairs of the visible light images 31 and the ultraviolet light images 32 as a set of training data from the image acquisition unit 12. The training data generation unit 13 generates a predetermined number of pairs of training data and feeds them to the training unit 14.

The training unit 14 has a model having a certain input and output relationship and changes the input and output relationship of the model with machine learning. As the model, for example, a supervised training model such as a multi-layer neural network or a genetic algorithm, a reinforcement learning model or the like can be implemented. Also, deep learning, random forest regression, kernel ridge regression or the like can be used as machine learning schemes for models. For example, if the model is of the supervised learning type, the training unit 14 uses the training data generated by the training data generation unit 13 to perform machine learning on the model such that the input and output relationship of the model can approach the input and output relationship of the training data. The training unit 14 finishes the machine learning and feeds the trained model embodying the input and output relationship of the training data to the picking position estimation unit 15. Note that the terminologies "training" or "trained model" may be sometimes referred to as "generating" and "generative model", respectively.

The picking position estimation unit 15 (estimation unit) uses the trained model, which results from the machine learning at the training unit 14, to estimate information regarding a light emitting unit from the visible light image 31 captured with the camera 4. Specifically, the picking position estimation unit 15 estimates a potential position of the fluorescent marker 6 in the target object 20 from the visible light image 31 to infer the picking position of the target object 20.

The robotic control unit 16 controls operations associated with the target object 20 with the robotic arm 5 depending on the information regarding the light emitting unit estimated by the picking position estimation unit 15. Specifically, when the target object 20 is a clothing, the robotic control unit 16 controls the operations of the robotic arm 5 to grasp the picking position for the clothing 20 estimated by the picking position estimation unit 15 and perform a task to fold the clothing.

In the first embodiment, activation timings of components of the controller 10 can be separated into two phases: "training phase" where the training data generation unit 13 and the training unit 14 perform the machine learning on the model; and "inference phase" where the picking position estimation unit 15 and the robotic control unit 16 use the trained model to estimate the picking position of the clothing 20 and perform the picking operation and the folding operation with the robotic arm 5. As illustrated in FIG. 1, the target object 20 having the fluorescent maker 6 attached at the picking position is used to acquire the training data for the picking position in the training phase while the target object 20, to which the fluorescent marker 6 is not attached, is available in the inference phase.

Note that functional blocks of the controller 10 shown in FIG. 1 are separated to describe multiple functionalities of the controller 10 for convenience. The multiple functional blocks may be combined as a single arrangement, or the single functional block may be divided into multiple functional blocks. For example, if the output of the trained model is a control amount of the robotic arm 5 instead of the picking position, the picking position estimation unit 15 may be included in the robotic control unit 16 because of unnecessity of explicit estimation of the picking position.

According to the first embodiment, the training data generation unit 13, the training unit 14 and the picking position estimation unit 15 composes "a detection unit that detects a light emitting unit based on the ultraviolet light image 32 captured with the camera 4 during switching illuminations by the illumination control unit 11".

Figure 2:
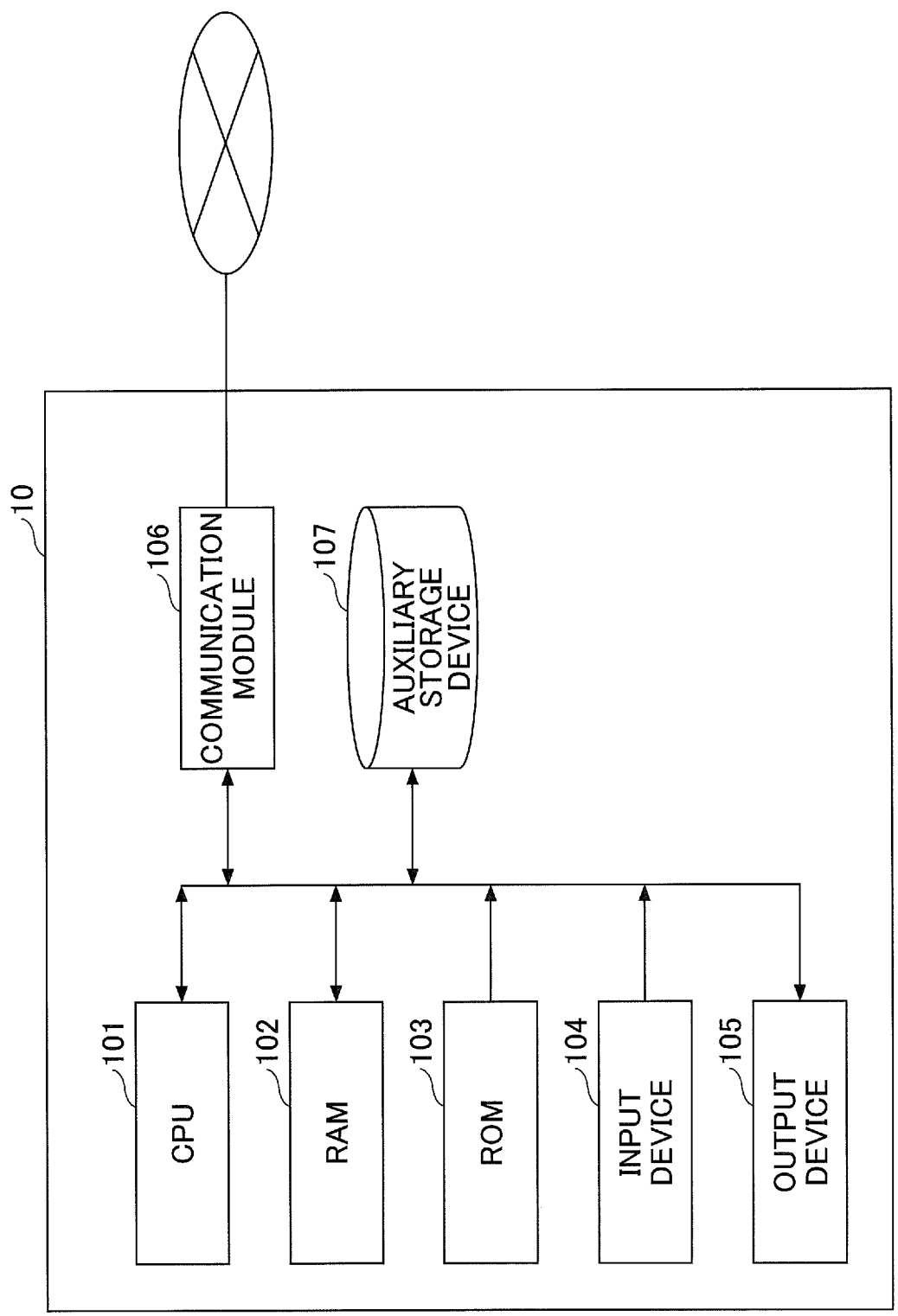
FIG. 2 is a hardware arrangement diagram of a controller.

FIG. 2 is a hardware arrangement diagram of the controller 10. As illustrated in FIG. 2, the controller 10 can be physically arranged as a computer system including a CPU (Central Processing Unit) 101, a RAM (Random Access Memory) 102 and a ROM (Read Only Memory) serving as a main storage device, an input device 104 such as a keyboard and a mouse, an output device 105 such as a display, a communication module 106 serving as a transceiver device such as a network card, an auxiliary storage device 107 and so on.

The respective functionalities of the controller 10 shown in FIG. 1 may be implemented by loading a predetermined computer software item on the hardware items such as the CPU 101 and the RAM 102, operating the communication module 106, the input device 104 and the output device 105 under the control of the CPU 101 and reading and writing data from and into the RAM 101 and the auxiliary storage device 107. In other words, the controller 10 functions as the illumination control unit 11, the image acquisition unit 12, the training data generation unit 13, the training unit 14 (trained model), the picking position estimation unit 15 and the robotic control unit 16 in FIG. 1 by causing the computer to execute programs of the present embodiment.

Also, the respective functionalities of the controller 10 may be one or more circuits that are composed of an analog circuit, a digital circuit or an analog-digital mixture circuit. Also, a control circuit for controlling the respective functionalities may be provided. The respective circuits may be implemented with an ASIC (Application Specific Integrated Circuit), a FPGA (Field Programmable Gate Array) or the like.

At least a portion of the respective functionalities of the controller 10 may be arranged with hardware items or software items that are executed by the CPU or the like. If the controller 10 is arranged with the software items, a program for implementing the controller 10 and at least a portion thereof is stored in a storage medium such as a flexible disk or a CD-ROM, and the controller 10 may be implemented by loading the program into a computer. The storage medium is not limited to a removable type such as a magnetic disk or an optical disk and may be a fixed type of storage medium such as a hard disk device and a memory. In other words, information progressing by the software items may be implemented by means of hardware resources. In addition, the processing by the software items may be implemented with one or more circuits such as a FPGA and executed by hardware items such as a processor. A job may be performed by means of an accelerator such as a GPU (Graphics Processing Unit), for example.

For example, a computer can be made as the apparatus according to the above embodiments by the computer reading a dedicated software item stored in a computer-readable storage medium. The type of storage medium is not limited to a certain one. Also, the computer can be made as the apparatus according to the above embodiments by the computer installing the dedicated software item downloaded via a communication network. In this manner, the information processing by the software items is specifically implemented with hardware resources. Note that one or more hardware items may be provided for each type of hardware resource such as a memory, a processor and a computer.

The controller 10, the visible light illumination 2, the ultraviolet light illumination 3 and the camera 4 can be mounted to the body of a robot including the robotic arm 5. Alternatively, the controller 10, the visible light illumination 2, the ultraviolet light illumination 3 and the camera 4 may be located at physical positions away from the robot including the robotic arm 5 and be communicatively coupled to the robot.

Alternatively, among the respective functional units of the controller 10, the training data generation unit 13 and the training unit 14 for use in training may be provided as a separate body from the robot, and the picking position estimation unit 15 and the robotic control unit 16 for use in estimation may be provided in the robot.

Also, the controller 10 may not be made up of a single body, and a portion of the functionalities of the controller 10 may be located at a position physically away from the body of the controller 10. For example, the illumination control unit 11 of the controller 10 may be provided within or near the visible light illumination 2 and/or the ultraviolet light illumination 3.

Figure 3:
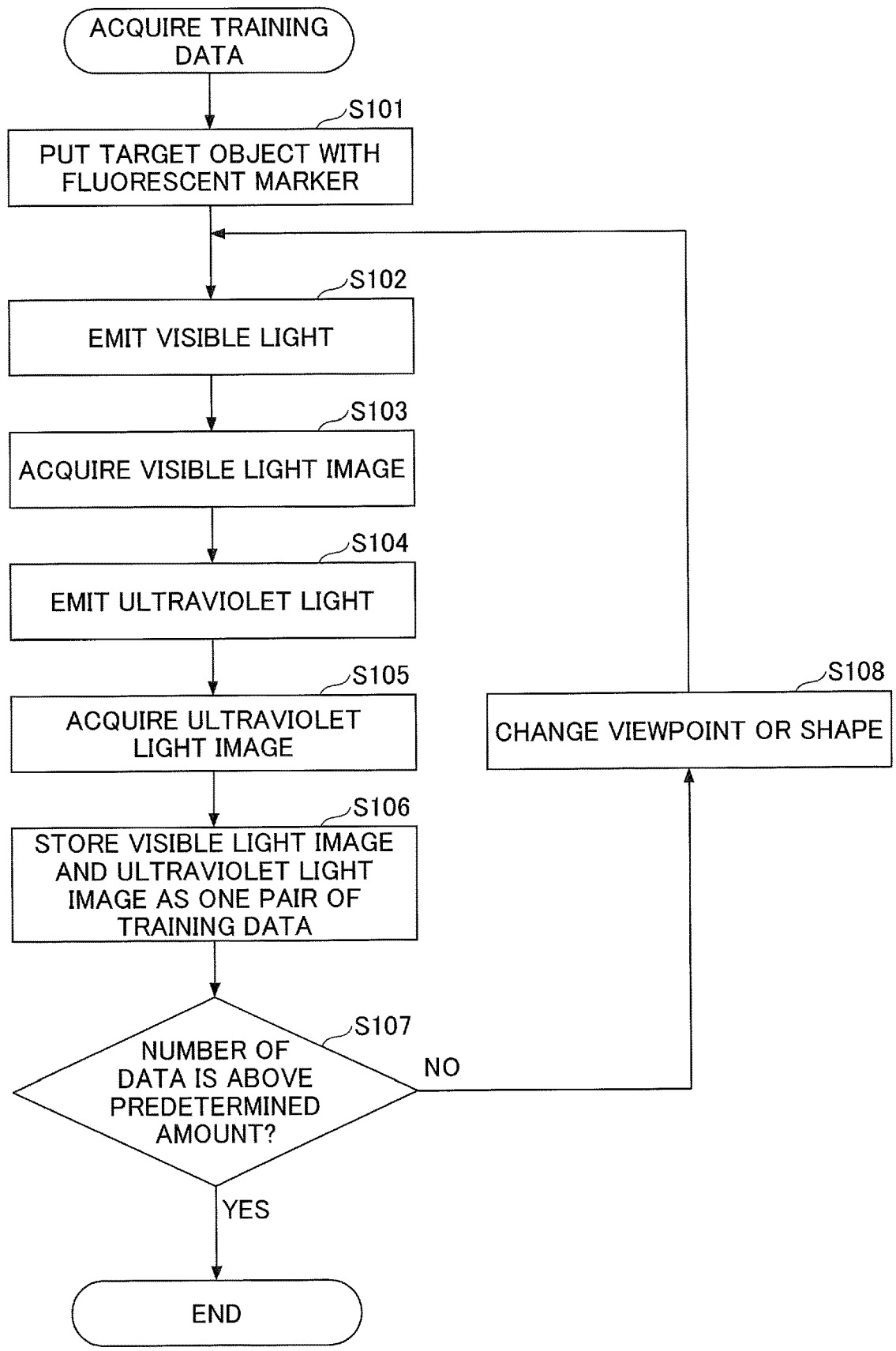
FIG. 3 is a flowchart of a training data acquisition operation according to the first embodiment.

FIG. 3 is a flowchart of a training data acquisition operation according to the first embodiment. The operation of the flowchart in FIG. 3 is performed prior to machine learning for a model by the training unit 14. In the present embodiment, supervised learning is illustratively described as the model training scheme.

At step S101, the target object 20 (to-be-trained object) with the fluorescent marker 6 is put in a capturing area of the camera 4.

At step S102, the illumination control unit 11 controls the visible light illumination 2 to turn on the light and the ultraviolet light illumination 3 to turn off the light so as to illuminate the target object 20 with the visible light.

At step S103, the image acquisition unit 12 acquires a visible light image 31 (training visible light image) in a state where the visible light is emitted to the target object 20.

At step S104, the illumination control unit 11 controls the visible light illumination 2 to turn off the light and the ultraviolet light illumination 3 to turn off the light so as to emit the ultraviolet light to the target object 20.

At step S105, the image acquisition unit 12 acquires an ultraviolet light image 32 (training invisible light image) in a state where the ultraviolet light is emitted to the target object 20.

At step S106, the training data generation unit 13 stores the visible light image 31 acquired at step S103 and the ultraviolet light image 32 acquired at step S105 as a pair of training data.

At step S107, the training data generation unit 13 determines whether the stored number of training data is greater than or equal to a predetermined amount. If the stored number of training data is smaller than the predetermined amount (S107: NO), the flow proceeds to step S108, and the viewpoint of the camera 4 and the shape of the target object 20 may be changed. Then, the flow returns to step S102, and the training data is repeatedly acquired. Note that the viewpoint of the camera 4 may be changed with provision of a mechanism that allows the camera 4 to automatically move around a platform, on which the target object 20 is put, and rotationally move the camera 4 while capturing the surroundings of the target object 20. Also, the shape of the target object 20 may be changed by changing a ground portion of the target object 20 put on the platform, for example, if the target object 20 is a rigid object such as a cup, by replacing the top and bottom of the cup. Also, if the target object 20 is a flexible object such as a clothing, the position of the fluorescent marker 6 on the target object 20 may be changed by rounding or folding the clothing.

FIG. 4 is a diagram for illustrating a first exemplary captured image of the target object 20 according to the first embodiment. FIG. 5 is a diagram for illustrating a second exemplary captured image of the target object 20 according to the first embodiment. In FIGS. 4 and 5, (A) is an exemplary visible light image 31, and (B) is an exemplary ultraviolet light image 32. (A) and (B) are paired as a pair of training data.

Figure 4A:
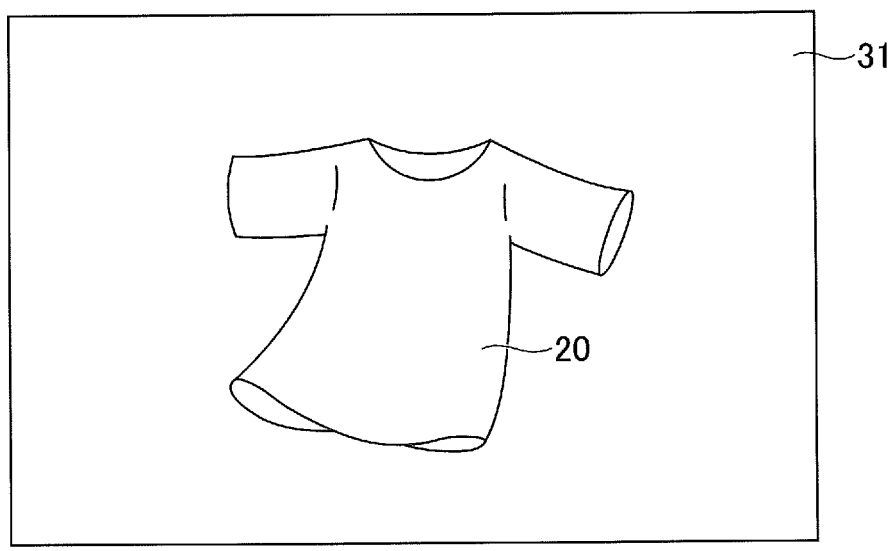
FIGS. 4A and 4B are diagrams for illustrating a first exemplary captured image of a target object according to the first embodiment.
Figure 4B:
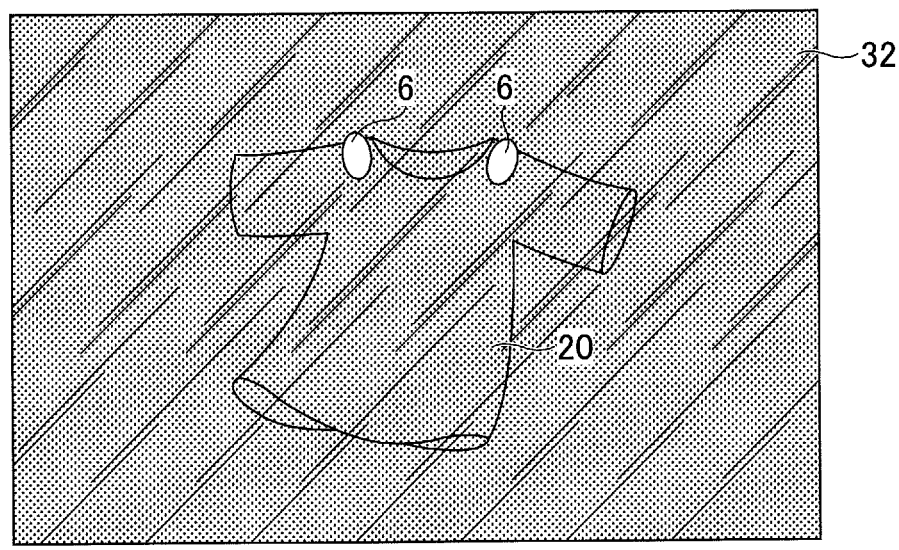

In the example shown in FIG. 4, a T shirt as the target object 20 is neatly spread. As illustrated in FIG. 4(A), the fluorescent marker 6 does not emit the light for the visible light, and accordingly the fluorescent marker 6 is not captured into the visible light image 31. On the other hand, as illustrated in FIG. 4(B), the fluorescent marker 6 emits the light in the ultraviolet light image 32, and accordingly the emitted light is clearly captured at the positions of both shoulders of the T shirt.

Figure 5A:
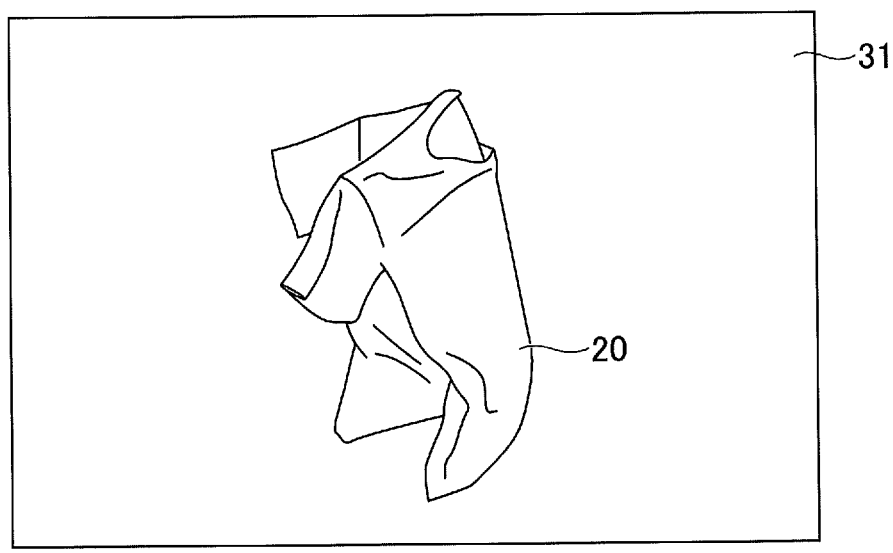
FIGS. 5A and 5B are diagrams for illustrating a second exemplary captured image of a target object according to the first embodiment.
Figure 5B:
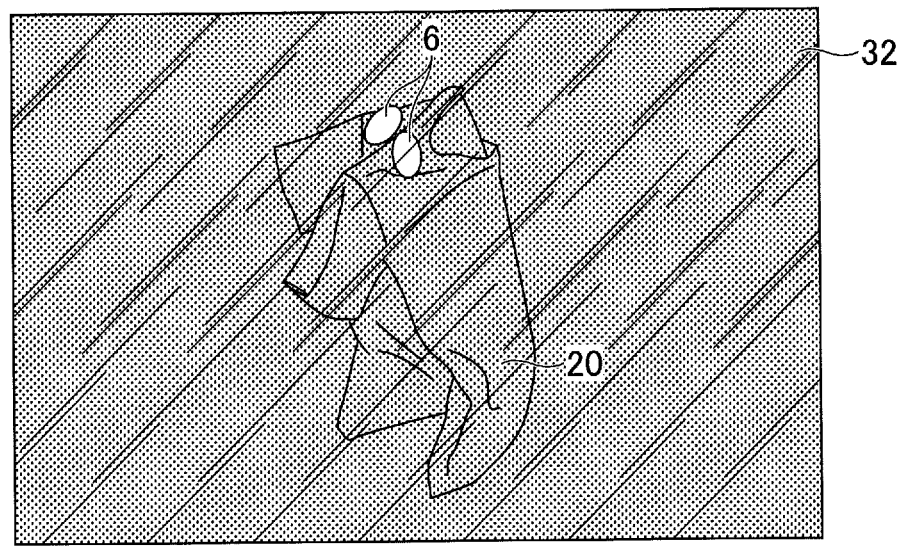

Meanwhile, in the example shown in FIG. 5, the T shirt as the target object is crumpled. At step S108, the shape of the target object 20 may be changed from the state shown in FIG. 4 to the state shown in FIG. 5, for example. In this example, as in the example shown in FIG. 4, the fluorescent marker 6 is not captured in the visible light image 31 as illustrated in FIG. 5(A), and the fluorescent marker 6 emits the light in the ultraviolet light image 32 as illustrated in FIG. 5(B). In this manner, the positions of both shoulders can be identified as a target of the picking position. The positions of the fluorescent markers 6 for various shapes of the T shirt as the target object 20, that is, information regarding the positions of both shoulders, can be used as the training data to generate a trained model that can appropriately determine specific positions suitable for manipulation of a robot as specific parts of the target object 20 even if the fluorescent marker 6 is not attached to the target object 20. In this manner, the inference capability of the trained model can be improved, and the accuracy of picking operations of the robot can be enhanced.

Also, in this manner, by using the fluorescent marker 6 that is invisible under the visible light, a set of an image having the marker indicated and an image having the marker not-indicated, that is, the image that can be considered as equivalent with image data to which the marker is not attached on the object, can be easily generated by means of the single object. As a result, the training dataset can be easily generated.

On the other hand, if the number of stored training data is greater than or equal to the predetermined amount (S107: YES), the flow ends. After that, the training unit 14 performs machine learning on the model by means of the stored training data.

FIG. 6 is a flowchart of robotic picking control according to the first embodiment. Operations of the flowchart of FIG. 6 are performed after the training unit 14 performs the machine learning for the model.

At step S201, the target object 20 (to-be-manipulated object), to which the fluorescent marker 6 is not attached, is put in a capturing area of the camera 4.

At step S202, the illumination control unit 11 controls the visible light illumination 2 to turn on the light and the ultraviolet light illumination 3 to turn off the light to emit the visible light to the target object 20.

At step S203, the image acquisition unit 12 acquires the visible light image 31 in a state where the visible light is emitted to the target object 20. Note that the camera 4 for capturing the visible light image 31 acquired at this step may be different from the camera 4 that has captured the images at steps S103 and S105 of the training data acquisition operation in FIG. 3.

At step S204, the picking position estimation unit 15 inputs the visible light image 31 to the trained model to estimate the picking position of the target object 20. As illustrated with reference to FIGS. 5 and 6, the input and output relationship for the trained model is trained to output the marker position indicated in the ultraviolet light image 32 for the incoming visible light image 31 to which the fluorescent marker 6 is not indicated, and if the visible light image 31 to which the fluorescent marker 6 is not indicated is fed to the trained model, the position of the fluorescent marker 6 in the visible light image 31, that is, the picking position of the target object 20, is output.

At step S205, the robotic control unit 16 controls the robotic arm 5 to grasp the picking position that has been estimated at step S204.

At step S206, the robotic control unit 16 performs a robotic arm operation after grasping the target object 20. As such an operation, for example, if the target object 20 is a clothing, a clothing folding task is assumed. If the target object 20 is a dishware such as a mug, a task of moving the picked dishware to a predetermined position is assumed.

Note that multiple types of fluorescent markers 6 attached to the target object 20 may be used. For example, in the case of the folding task, multiple types of fluorescent markers 6 for emission with different colors at step S101 of the flowchart of FIG. 3 may be provided to the clothing 20 to indicate the folding order. In this case, at step S206 of the flowchart of FIG. 6, the picking position of the clothing 20 with the robotic arm 5 is sequentially changed in the order indicated with the emission colors of the fluorescent marker 6 so that the folding operation can be performed in a predetermined procedure. According to this arrangement, more complicated operations can be indicated with the simple task of attaching the fluorescent markers 6 to the target object 20. Also, the multiple types of fluorescent markers 6 may differ from each other in terms of the respective shapes and attachment manners. For example, a first fluorescent marker 6 may be a solid line, and a second fluorescent marker 6 may be a dashed line.

According to the robotic controller 1 of the first embodiment, the fluorescent marker 6 is attached at the picking position of the target object 20 such as a clothing, and the ultraviolet light image 32 obtained by illuminating the fluorescent marker 6 is used as the training data for machine learning, which can facilitate inference of the picking position.

Also, the robotic controller 1 of the first embodiment can easily generate the training data by alternately capturing the visible light image 31 and the ultraviolet light image 32 of the target object 20 with the fluorescent marker 6. Accordingly, preparation tasks for machine learning can be facilitated. Also, estimation accuracy of the trained model can be improved. Also, when robotic operations are controlled by means of the trained model, the picking position of the target object 20 can be estimated from only the visible light image 31 of the target object 20 without the fluorescent marker 6, and the picking operation for the target object 20 with the robotic arm 5 can be easily and appropriately achieved. As a result, the robotic controller 1 of the first embodiment can provide an easier and more accurate novel object recognition technique based on image information.

Also, after the training unit 14 has finished the machine learning on the model, the picking position can be estimated without attaching the fluorescent marker 6 to the target object 20 as in the actual situation where the robot is caused to perform the picking operations (the above-stated "at estimation"), and no special target object 20 for robotic operations needs to be prepared.
Accordingly, the robot can be introduced to living environment for human beings at a reasonable cost, for example, and the versatility of the robot can be improved. These benefits are particularly helpful for popularization of personal robots for use in various supports such as housework in the living environment for human beings.

Second Embodiment

Figure 7:
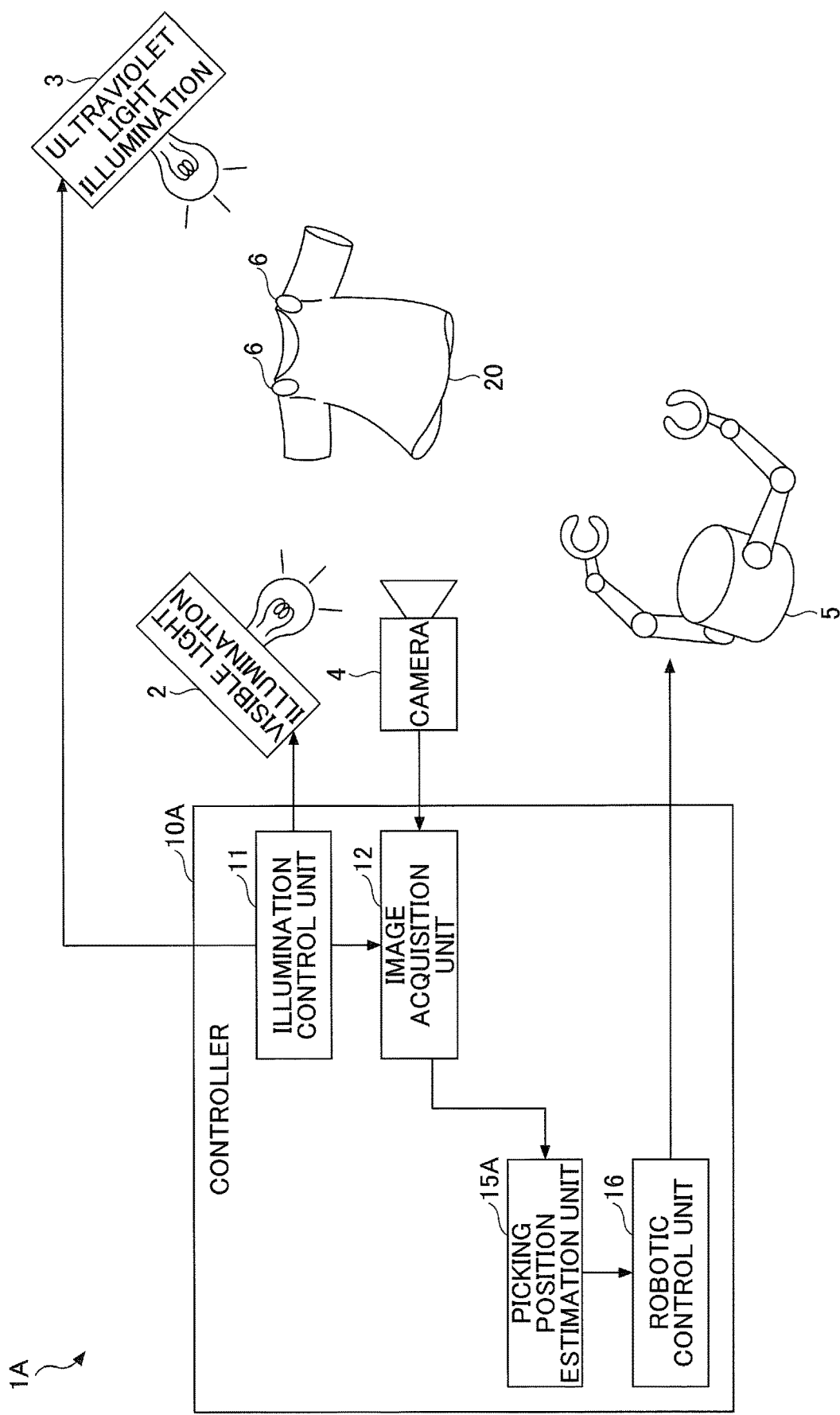
FIG. 7 is a functional block diagram of a robotic controller according to a second embodiment.

The second embodiment is described with reference to FIGS. 7 and 8. FIG. 7 is a functional block diagram of a robotic controller 1A according to the second embodiment. As illustrated in FIG. 7, the robotic controller 1A of the second embodiment differs from that of the first embodiment in that the robotic controller A does not have the training data generation unit 13 and the training unit 14.

Also, in the robotic controller 1A of the second embodiment, a robot 5 recognizes the fluorescent marker 6 and grasps the target object 20 to which the fluorescent marker 6 is attached. In other words, the picking position estimation unit 15A identifies the picking position of the target object 20 based on the position of the fluorescent marker 6 imaged in the ultraviolet light image 32 with reference to the ultraviolet light image 32.

In the second embodiment, the picking position estimation unit 15A serves as "a detection unit that detects a light emitting unit based on the ultraviolet light image 32 captured with the camera 4".

Figure 8:
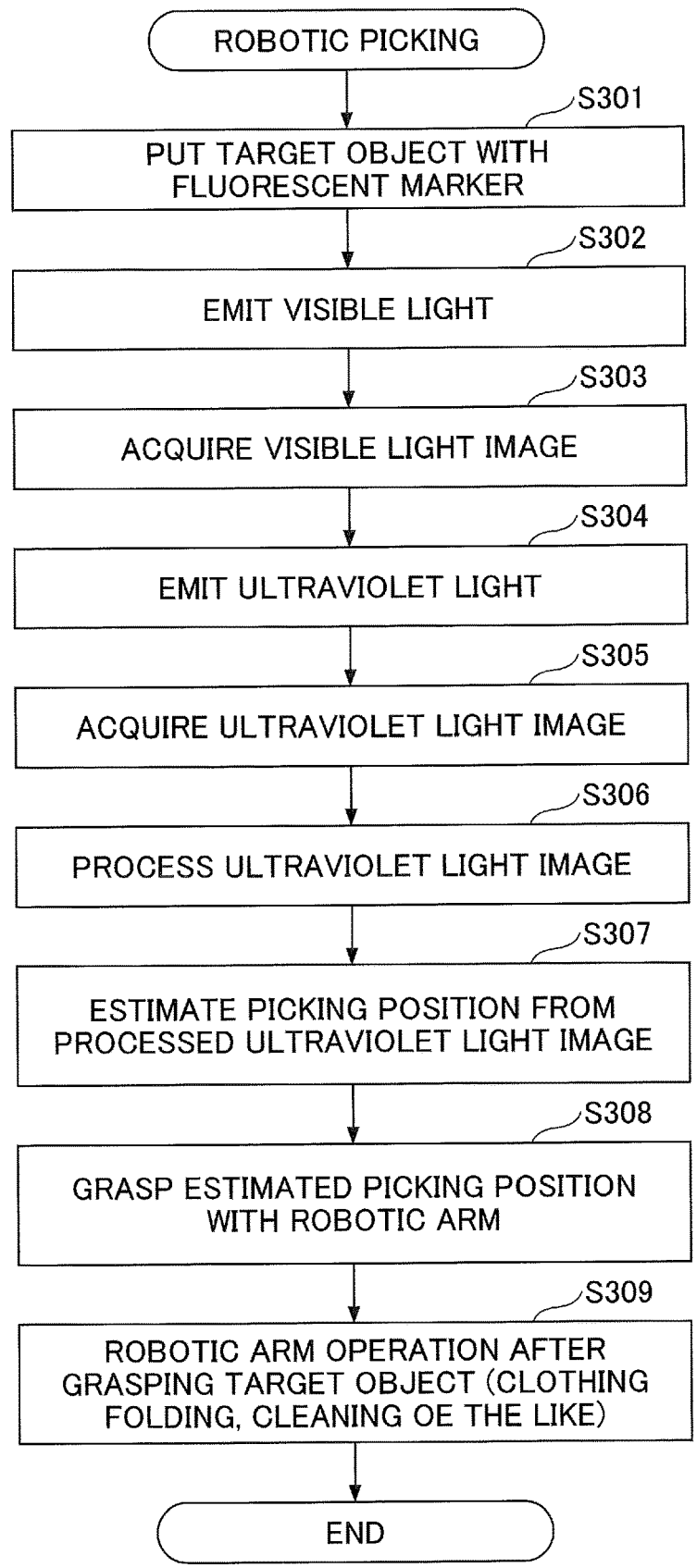
FIG. 8 is a flowchart of robotic picking control according to the second embodiment.

FIG. 8 is a flowchart of robotic picking control according to the second embodiment.

At step S301, the target object 20, to which the fluorescent marker 6 is attached, is put in a capturing area of the camera 4.

At step S302, the illumination control unit 11 controls the ultraviolet light illumination 3 to turn off the light so that visible light is illuminated to the target object 20.

At step S303, the image acquisition unit 12 acquires the visible light image 31 in a state where the visible light is illuminated to the target object 20.

At step S304, the illumination control unit 11 controls the ultraviolet light illumination 3 to turn on the light so that the ultraviolet light is illuminated to the target object 20.

At step S305, the image acquisition unit 12 acquires the ultraviolet light image 32 in a state where the ultraviolet light is illuminated to the target object 20.

At step S306, the picking position estimation unit 15A processes the ultraviolet light image 32. For example, in order to emphasize a portion of the ultraviolet light image 32 where the light of the fluorescent marker 6 is captured (see FIGS. 4 and 5(B)), the picking position estimation unit 15A processes the ultraviolet light image 32 such that the image is duotoned to indicate the maker portion with a white color and other portions with a black color.

At step S307, the picking position estimation unit 15A detects the marker position from the processed ultraviolet light image 32 and estimates the detected marker position as the picking position for the target object 20.

At step S308, the robotic control unit 16 controls the robotic arm 5 to grasp the picking position that has been estimated at step S307.

At step S309, the robotic control unit 16 performs a robotic arm operation (a clothing folding task, a mug moving task or the like) after grasping the target object 20.

The robotic controller 1A according to the second embodiment can detect the position of the fluorescent marker 6 in the target object 20 directly from only the ultraviolet light image 32 of the target object 20, to which the fluorescent marker 6 is attached, without performing machine learning beforehand, and the picking position of the target object 20 can be easily and accurately detected.

Also, the fluorescent marker 6 is transparent under the visible light, and even if the target object 20 with the fluorescent marker 6 is put in the living environment for human beings, for example, the fluorescent marker 6 does not become an encumbrance to human's visual recognition of the target object 20 and does not undermine the design and beauty of the target object 20. Furthermore, if the ultraviolet light illumination 3 emits the light at a high frequency that cannot be visually recognized by human beings (for example, above 30 Hz), the ultraviolet light image 32 for detecting the picking position can be acquired without need of human's recognition. Accordingly, the robotic actions can be accurately controlled without providing influence to human's actions, for example, even in the environment where the distance between the robot and the human being is close and they can be in touch with each other such as within a resident, which can improve familiarity between the human beings and the robot.

In the present embodiment, the visible light illumination 2 may turn off the light while the ultraviolet light illumination 3 turns on the light. As a result, the ultraviolet light image 32, where the fluorescent marker 6 can be clearly recognized, can be acquired. On the other hand, if the fluorescent marker 6 can be appropriately recognized, the visible light illumination 2 may turn on the light at acquiring the ultraviolet light image 32. Also, the ultraviolet light image 32 may be similarly acquired in the environment where a visible light source that can be hardly controlled or cannot be controlled by the robotic controller 1A such as sunlight or room lighting is present and capturing with only the ultraviolet light is impossible. In this case, the ultraviolet light image 32 may be obtained by indicating the fluorescent marker 6 acquired under the ultraviolet light on the image acquired under the visible light.

Third Embodiment

Figure 9:
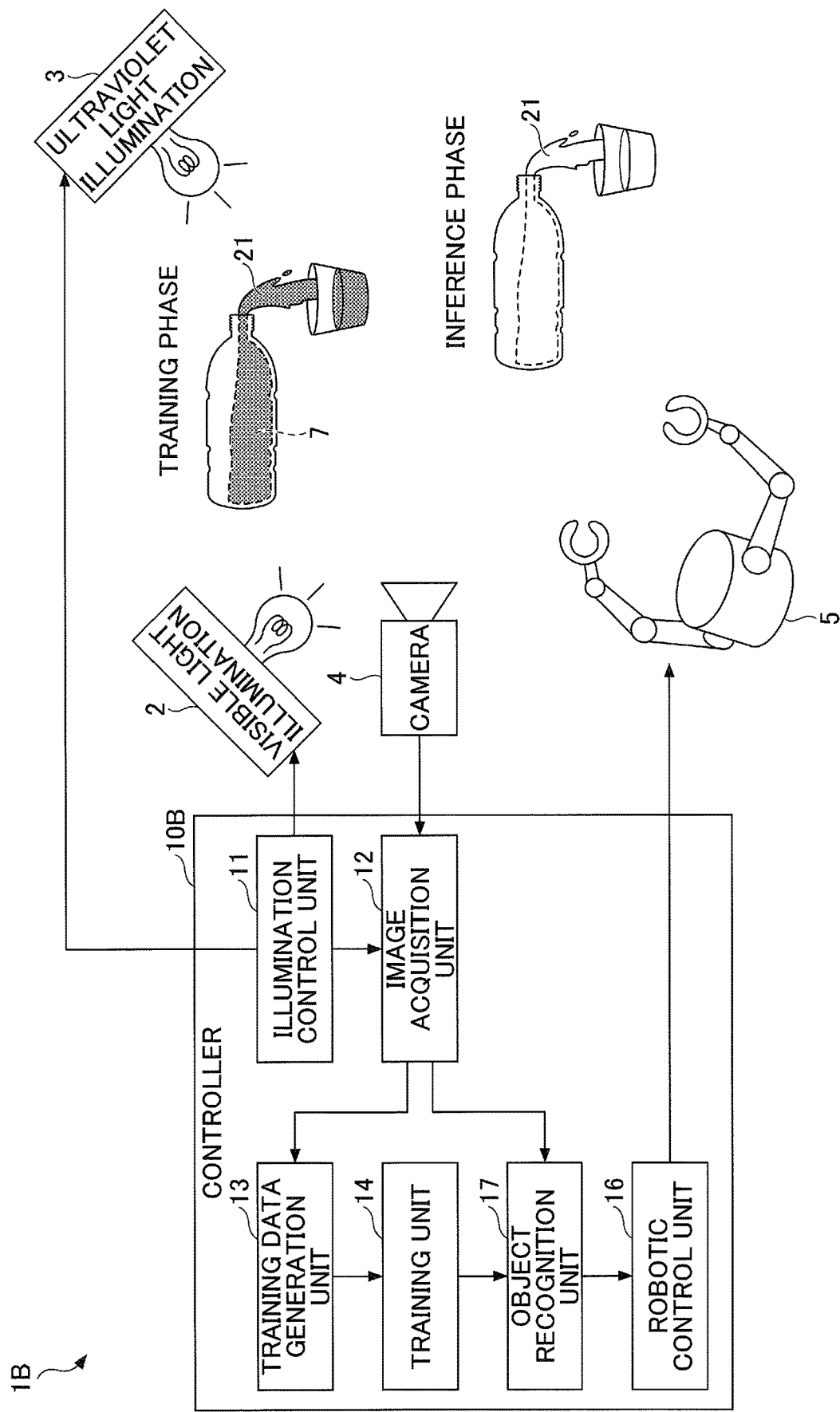
FIG. 9 is a functional block diagram of a robotic controller according to a third embodiment.

The third embodiment is described with reference to FIGS. 9 to 12. FIG. 9 is a functional block diagram of a robotic controller 1B according to the third embodiment. As illustrated in FIG. 9, according to the robotic controller 1B of the third embodiment, the target object 21 is a deformable object, such a liquid, a powder and granular material or a gas, and a light emitting unit (fluorescent marker) is a fluorescent material 7 mixed into the target object 21 or coated over the surface of the target object 21. Also, a learning system learns the relationship between the visible light image 31 and the outer shape of the target object 21 obtained by light emission of the fluorescent material 7 in the ultraviolet light image 32, and the trained model estimates the type, shape, position or the like of the target object 21 from the visible light image 31.

The robotic controller 10B has an object recognition unit 17.

The object recognition unit 17 (estimation unit) uses the trained model to estimate information on the light emitting unit from the visible light image 31 captured with the camera 4. Specifically, the object recognition unit 17 uses the trained model, which has resulted from machine learning by the training unit 14, to estimate the outer shape of the target object 21 from the visible light image 31 captured with the camera 4. In addition, the type of the target object 21 may be estimated. For example, if the outer shape of the target object 21 is accumulated in a predetermined area during movement from the upper portion to the lower portion, the object recognition unit 17 can recognize the target object 21 as an deformable object such as a liquid or a powder and granular object.

The third embodiment can be divided into two phases: "training phase" where the training data generation unit 13 and the training unit 14 perform machine learning on a model; and "inference phase" where the object recognition unit 17 and the robotic control unit 16 use the trained model to perform object recognition on the target object 21 and robotic arm operations corresponding to the object recognition. As illustrated in FIG. 9, the target object 21 that includes the powdery or liquid fluorescent material 7, for example, can be used at the training phase to estimate training data for the outer shape of the target object 21 whereas the target object 21 that does not include the fluorescent material 7 can be used at the inference phase.

In the third embodiment, the training data generation unit 13, the training unit 14 and the object recognition unit 17 compose "a detection unit that detects the light emitting unit based on the ultraviolet light image 32 captured with the camera 4 during switching illumination by the illumination control unit 11".

FIG. 10 is a flowchart of the training data acquisition operation according to the third embodiment. The operation of the flowchart in FIG. 10 is performed before the training unit 14 performs the machine learning for a model.

At step S401, the target object 21 (to-be-trained object) including the fluorescent material 7 is put in a capturing area of the camera 4.

At step S402, the illumination control unit 11 controls the visible light illumination 2 to turn on the light and the ultraviolet light illumination 3 to turn off the light to emit the visible light to the target object 21.

At step S403, the image acquisition unit 12 acquires the visible light image 31 in a state where the visible light is emitted to the target object 21.

At step S404, the illumination control unit 11 controls the visible light illumination 2 to turn off the light and the ultraviolet light illumination 3 to turn on the light to emit the ultraviolet light to the target object 21.

At step S405, the image acquisition unit 12 acquires the ultraviolet light image 32 in a state where the ultraviolet light is emitted to the target object 21.

At step S406, the training data generation unit 13 stores the visible light image 31 acquired at step S403 and the ultraviolet light image 32 acquired at step S405 as a pair of training data.

At step S407, the training data generation unit 13 determines whether the stored number of training data is greater than or equal to a predetermined amount. If the stored number of training data is smaller than the predetermined amount (S407: NO), the flow proceeds to step S408, and the viewpoint of the camera 4 and/or the shape of the target object 21 may be changed. Then, the flow returns to step S402, and the training data is acquired again. Note that the viewpoint of the camera 4 may be changed by providing a mechanism for allowing the camera 4 to automatically move around a platform and rotationally moving the camera 4 while capturing surroundings around the target object 21 located on the platform, for example. Also, if the target object 21 is water, the shape of the target object 21 may be changed by increasing or decreasing the amount of bottled water or by changing the shape of water dropping from a bottle to a glass by varying the dropping speed, for example.

Figure 11A:
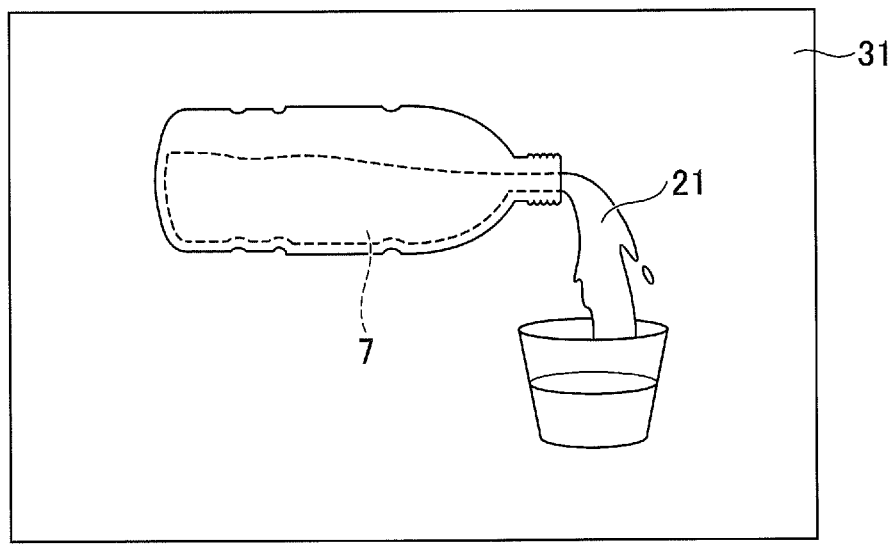
FIGS. 11A and 11B are diagrams for illustrating an exemplary captured image of a target object according to the third embodiment.
Figure 11B:
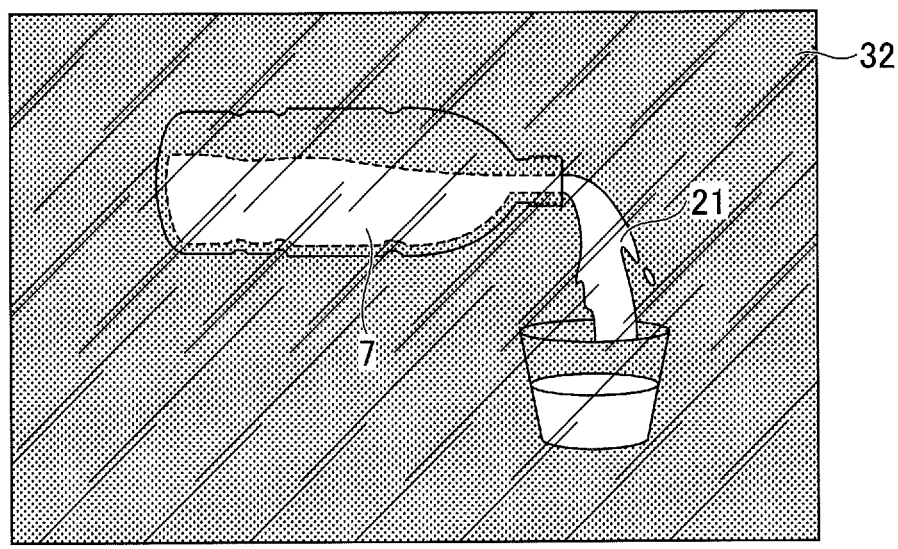

FIG. 11 is a diagram for illustrating an exemplary captured image of the target object 21 according to the third embodiment. In FIG. 11, (A) is an exemplary image of the visible light image 31, (B) is an exemplary image of the ultraviolet light image 32, and (A) and (B) are paired as one pair of training data. In the example in FIG. 11, as illustrated in FIG. 11(A), since the fluorescent material 7 is not illuminated for the visible light, the fluorescent material 7 is not imaged in the visible light image 31, and only the transparent water of the target object 21 is captured. On the other hand, as illustrated in FIG. 11(B), it is clearly imaged in the ultraviolet light image 32 that the fluorescent material 7 emits the light along the shape of water of the target object 21.

If the stored number of training data is greater than or equal to the predetermined amount (S407: YES), the flow ends. After that, the training unit 14 uses the stored training data to perform machine learning on a model.

Figure 12:
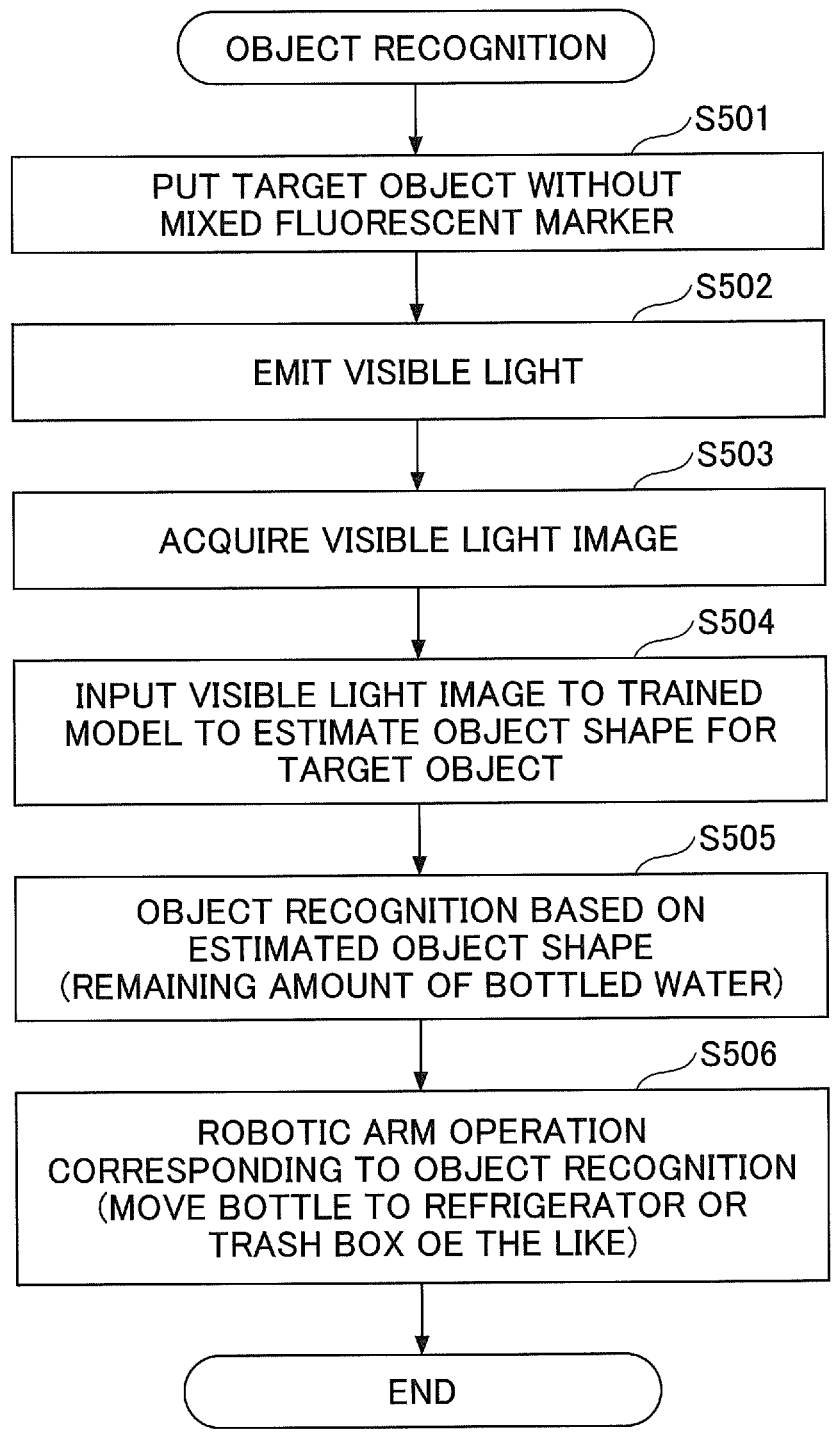
FIG. 12 is a flowchart of robotic picking control according to the third embodiment.

FIG. 12 is a flowchart of robotic picking control according to the third embodiment. The operation of the flowchart of FIG. 12 is performed after the training unit 14 has performed the machine learning on the model.

At step S501, the target object 21 (to-be-manipulated object) that does not include the fluorescent material 7 is put in a capturing area of the camera 4.

At step S502, the illumination control unit 11 controls the visible light illumination 2 to turn on the light and the ultraviolet light illumination 3 to turn off the light to emit the visible light to the target object 21.

At step S503, the image acquisition unit 12 acquires the visible light image 31 in a state where the visible light is emitted to the target object 21.

At step S504, the object recognition unit 17 inputs the visible light image to the trained model to estimate the object shape of the target object 21. As described with reference to FIG. 11, the input and output relationship for the trained model is trained such that the shape of the fluorescent material 7 indicated in the ultraviolet light image 32 can be generated for the incoming visible light image 31 where the fluorescent material 7 is not indicated, and if the visible light image 31 is fed into the trained model, the shape of the fluorescent material 7, that is, the outer shape of the target object 21, in the visible light image 31 is output by the trained model.

At step S505, the object recognition unit 17 performs object recognition based on the object shape estimated at step S504. In the example illustrated in FIG. 11, the object recognition unit 17 can recognize the remaining amount or outflow amount of bottled water.

At step S506, the robotic control unit 16 performs a robotic arm operation corresponding to the object recognition result at step S505. For example, if the remaining amount of bottled water is greater than or equal to a predetermined amount, the robotic control unit 16 can perform an operation to move the bottle including the water, which serves as the target object 21, to a refrigerator, and if the remaining amount is below the predetermined amount, the robotic control unit 16 can perform an operation to trash the bottle to a trash box.

According to existing object recognition techniques, it is difficult to recognize a transparent object such as water and a glass in image recognition. Particularly, if the object is formed of a liquid, the shape may sequentially change in accordance with segmentation, and generation of the training data for segmentation involves a significant cost. According to the third embodiment, however, by using the visible light image 31 and the ultraviolet light image 32 that are captured while switching between the visible light and the ultraviolet light at a high speed, for example, the position of the transparent object can be easily grasped, and annotation data for the segmentation can be generated. The model trained based on these data can be used to improve recognition accuracy of the transparent object.

Similarly, the data for semantic segmentation can be easily generated for non-transparent objects by providing (for example, coating) a marker (fluorescent material 7) to a portion of the objects and multiple types of markers to portions that are particularly desired to be recognized.

In other words, in the robotic controller 1B of the third embodiment, objects that are mainly transparent, such as a liquid, a powdery and granular object or a gas, or hardly take stable shape and can be hardly recognized through general image recognition are targeted as the target object 21. The training data can be also easily generated for these types of target objects by capturing the target objects 21 while switching between the visible light image 31 and the ultraviolet light image 32, which can facilitate preparation tasks for machine learning and improve the estimation accuracy of the trained model. Also, for example, provision of markers (fluorescent material 7) to the target object 21 that can be of variable shapes and separated into several portions such as foods allows the target object 20 to be recognized as the same single target object based on the markers even after processing the target object such as cutting.

As examples of the target object 21 according to the third embodiment, in addition to the above-stated bottled water, splashing water or oil, finely minced foods, powdered medicine put in a spoon, steam or the like may be included. Similar to the target object 21, as other objects hardly recognized in common image recognition, a transparent object, such as a container made of a glass or a transparent resin, what is difficult to perform edge detection due to its visible background such as a fence or a wire-mesh object, what has unregularly variable shapes such as a slime, what is mirror-finished such as a glass window or a mirror, and what reflects light such as a water surface or a corridor, may be included. For provision of the fluorescent material 7 to the target object 21, for example, the fluorescent material 7 may be coated on the surface of the target object 21 or be mixed into the target object 21, if it is difficult to coat it over the surface of the target object 21.

Fourth Embodiment

Figure 13:
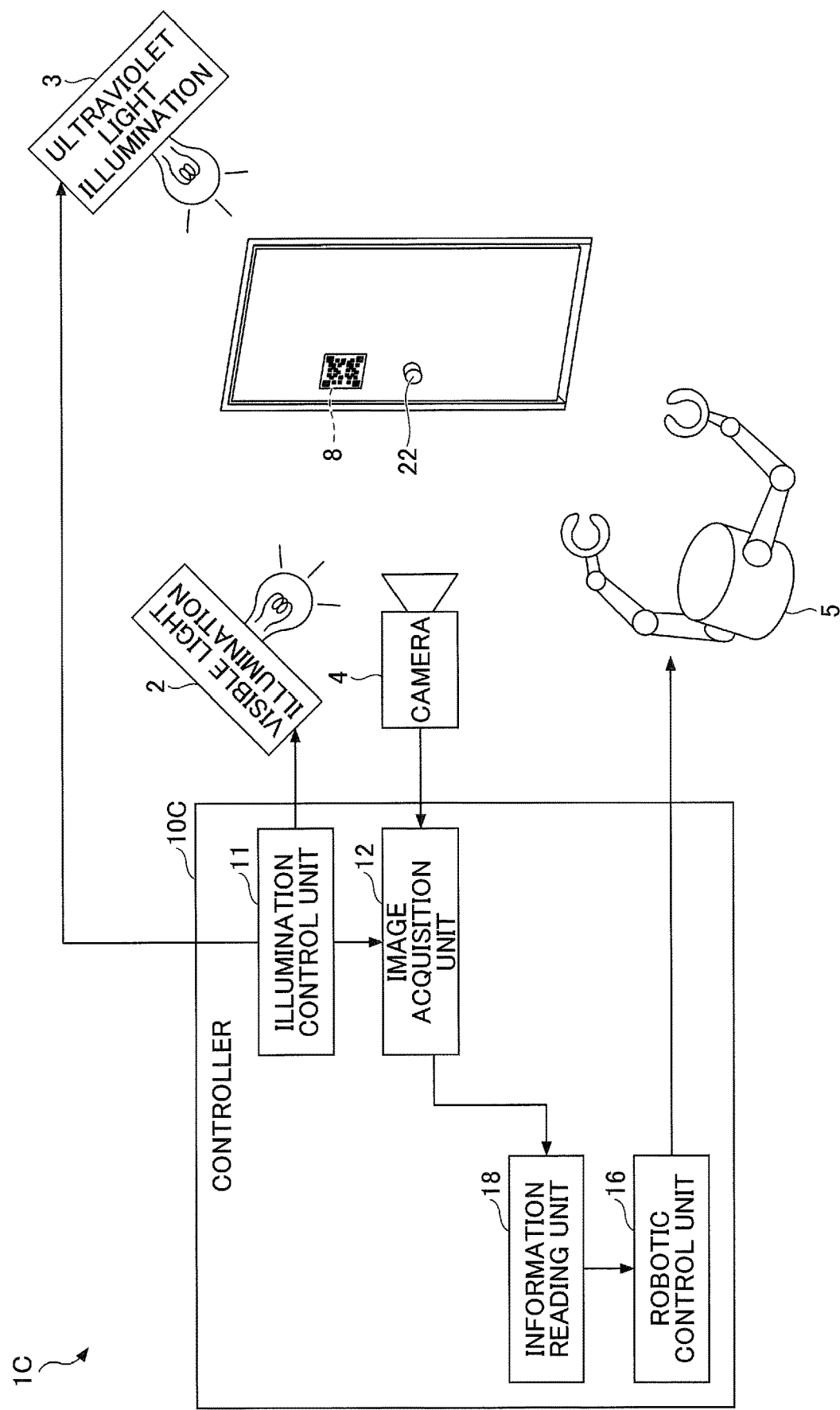
FIG. 13 is a functional block diagram of a robotic controller according to a fourth embodiment.

The fourth embodiment is described with reference to FIGS. 13 and 14. FIG. 13 is a functional block diagram of a robotic controller 1C according to the fourth embodiment. As illustrated in FIG. 13, the robotic controller 1C of the fourth embodiment does not have training related units (the training data generation unit 13 and the training unit 14) and includes a fluorescent information unit 8 including various information pieces associated with the target object 22 that emits light by illuminating ultraviolet light as the light emitting unit.

A controller 10C has an information reading unit 18 serving as a component replaced with the picking position estimation unit 15 of the first embodiment.

The information reading unit 18 reads various information pieces regarding the target object 22 based on the fluorescent information unit 8 in the ultraviolet light image 32. The fluorescent information unit 8 may be a two-dimensional barcode that emits the light by illuminating invisible light, as illustrated in FIG. 13, for example.

The robotic control unit 16 controls operations of the robotic arm 5 depending on various information pieces regarding the target object 22 that are read by the information reading unit 18. For example, in the example in FIG. 13, the target object 22 is a door knob, and the fluorescent information unit 8 includes information to indicate that a door with this door knob is of a push-opened type. The robotic control unit 16 controls the robotic arm 5 to grasp the door knob 22 and push the door depending on the information in the fluorescent information unit 8.

According to the fourth embodiment, the information reading unit 18 composes "a detection unit that detects the light emitting unit based on the ultraviolet light image 32 captured with the camera 4 while switching illumination by the illumination control unit 11".

Figure 14:
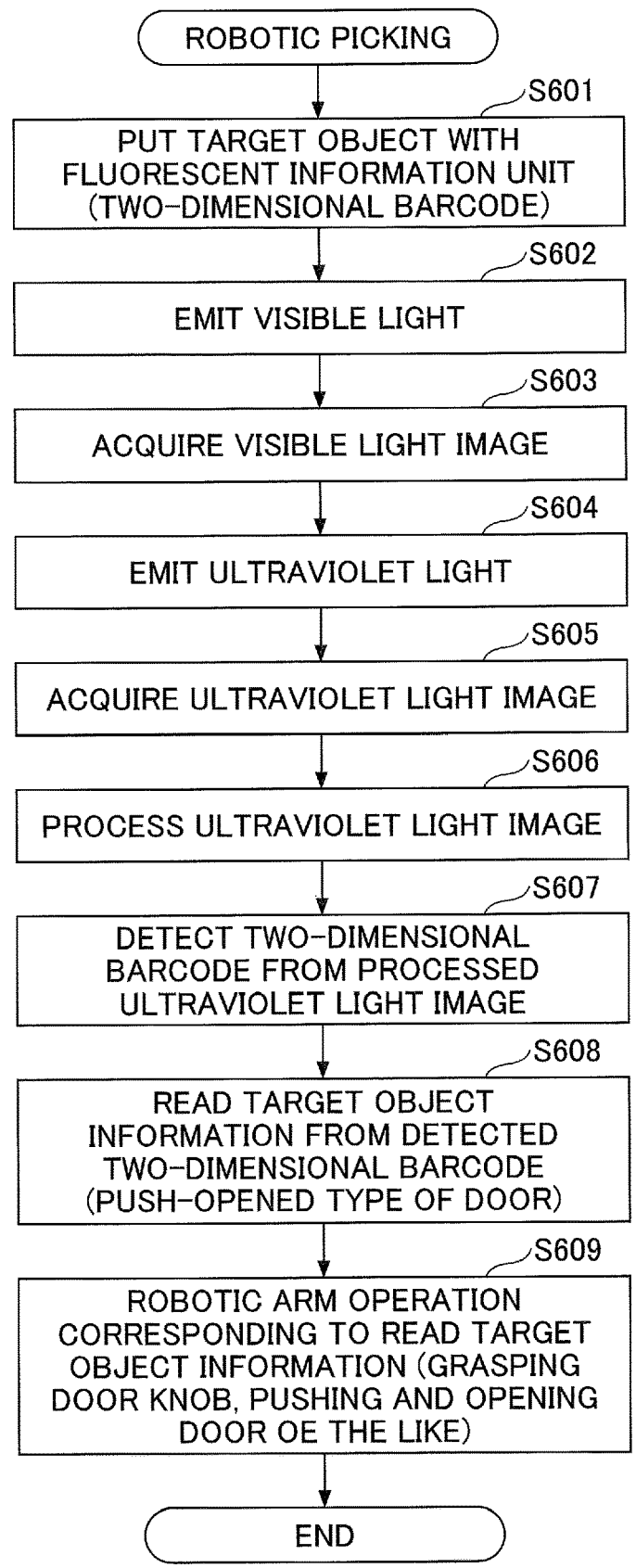
FIG. 14 is a flowchart of robotic control according to the fourth embodiment.

FIG. 14 is a flowchart of robotic operation control according to the fourth embodiment.

At step S601, the target object 22 with the fluorescent information unit 8 (two-dimensional fluorescent barcode) is put in a capturing area of the camera 4.

At step S602, the illumination control unit 11 controls the visible light illumination 2 to turn on the light and the ultraviolet light illumination 3 to turn off the light to emit the visible light to the target object 22.

At step S603, the image acquisition unit 12 acquires the visible light image 31 in a state where the visible light is emitted to the target object 22.

At step S604, the illumination control unit 11 controls the ultraviolet light illumination 3 to turn on the light to emit the ultraviolet light to the target object 22.

At step S605, the image acquisition unit 12 acquires the ultraviolet light image 32 in a state where the ultraviolet light is emitted to the target object 22.

At step S606, the information reading unit 18 processes the ultraviolet light image 32. For example, in order to emphasize a portion of the ultraviolet light image 32 where the light of the fluorescent information unit 8 is captured, the information reading unit 18 may process the ultraviolet light image 32 such that the image is duotoned to indicate the portion of the fluorescent information unit 8 as white and the other portion as black.

At step S607, the information reading unit 18 detects the two-dimensional barcode in the fluorescent information unit 8 from the processed ultraviolet light image.

At step S608, the information reading unit 18 reads information regarding the target object 22 from the detected two-dimensional barcode.

At step S609, the robotic control unit 16 performs a robotic arm operation corresponding to the information regarding the target object 22 that has been read at step S608. For example, if the target object 22 is a door knob and the information read from the fluorescent information unit 8 indicates that a door with this door knob is of a push-open type, the robotic control unit 16 causes the robotic arm 5 to perform a task of grasping the door knob 22 and opening the door.

According to the robotic controller 1C of the fourth embodiment, since the information on the fluorescent information unit 8 in the target object 22 is directly read from only the ultraviolet light image 32 of the target object 22 with the fluorescent information unit 8, the robot can easily obtain information required for determining robotic operations.

Also, the fluorescent information unit 8 is transparent under the visible light, and accordingly even if the target object 22 with the fluorescent information unit 8 is in human's living environment, for example, the fluorescent information unit 8 may not hinder human's visual recognition for the target object 22 and may not lose the design and beauty of the target object 20. Furthermore, if the visible light illumination 2 and the ultraviolet light illumination 3 are switched at a high frequency (for example, above 30 Hz) so that human beings cannot recognize the switching visually, the ultraviolet light image 32 for obtaining the information on the fluorescent information unit 8 can be acquired without human's recognition. Accordingly, even in the environment where the distance between human beings and the robot is close and can be touched with each other such as in residence, the robotic actions can be accurately controlled without influencing human's actions, which can improve familiarity between the human beings and the robot.

[Variations]

Figure 15:
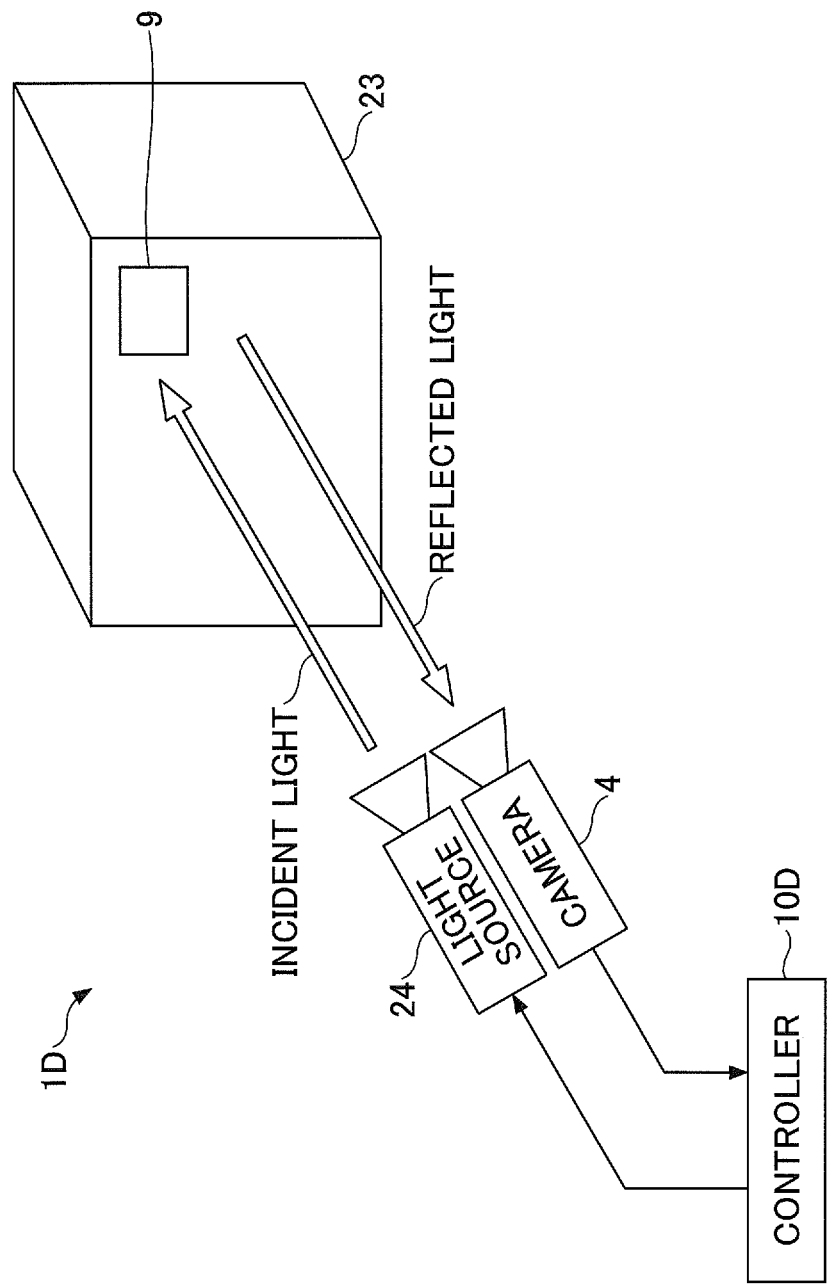
FIG. 15 is an arrangement diagram of core parts of a robotic controller according to a variation.

Variations of the above embodiments are described with reference to FIG. 15. FIG. 15 is an architectural diagram of a core part of a robotic controller 1D according to a variation. In FIG. 15, an imaging system of the robotic controller 1D such as the camera 4 and the light source 24 is illustrated, and the same elements as those of the above embodiments are omitted. The robotic controller 1D according to the variation has the same controller 10D as the controllers 10, 10A, 10B and 10C of the above embodiments and can perform the same robotic action learning and planning as the above embodiments.

In the exemplary variation, "a reflection unit including a recursive reflective material" is used, instead of "the light emitting unit recognizable under invisible light (for example, the fluorescent marker 6) used in the above embodiments.

The recursive reflective material refers to a material that arises a phenomenon called recursive reflection where incident light rays are reflected to the same direction as the incident direction. In general, three types of reflection, that is, diffuse reflection, specular reflection (regular reflection) and recursive reflection, are known. The diffuse reflection is the most common and means a phenomenon where the incident light hits a material having an uneven surface and the reflected light rays diffuse to various directions. The specular reflection means a phenomenon where the incident light rays hit a material having a smooth surface such as a mirror and the reflection light rays are reflected to one direction in accordance with principle "incident angle=reflection angle". in contrast, the recursive reflection means the phenomenon where the incident light rays are reflected to the same direction as the incident direction by means of a special material.

In a variation, the recursive reflection by means of the recursive reflective material is used to generate a marker 9 (reflection unit) that appears or disappears depending on the position of the light source 24 with respect to the view from the camera 4.

A procedure for performing robotic action learning or action designing using the marker 9 including the recursive reflective material is as follows.

(1) The recursive reflective material is coated on the position where the marker 9 for the target object 23 is desired to be attached.

(2) In the view of the target object 23 from the camera 4 under common environmental light (sunlight, visible light or the like), the marker 9 appears as usual due to the diffuse reflection of original materials of the target object 23 (in other words, emission of the marker 9 cannot be visually recognized).

(3) on the other hand, when the light is emitted by the light source 24 from the neighborhood of the camera 4 to the same direction as the viewing direction of the camera 4, the marker portion reflects the light toward the camera 4 due to the recursive reflection, and the light may appear more strongly reflected than other (diffuse-reflecting) portions.

(4) The light reflecting with the recursive reflection is measured with the camera 4, and the marker portion can be extracted based on a threshold such as a luminance.

In a variation, as illustrated in FIG. 15, the light source 24 for emitting the light to the same direction as the view of the camera 4 is provided. The camera 4 can capture an image including reflected light from the marker 9 only at turning on the light source 24. Then, also in the robotic controller 1D according to the variation, the controller 10D can use the image including the reflected light (reflected light image) from the marker 9 at turning on the light source 24 to perform training and designing for robotic actions by training a model or identifying the picking position as in the above embodiments. Note that emitting the light to the same direction as the view of the camera 4 means emitting the light to the same direction in such a degree that the light reflected from the emitted light can be captured with the camera 4.

In other words, "the marker 9 (reflection unit) including the recursive reflective material" corresponds to "the light emitting unit" according to the embodiments, and their broader concept may be also referred to as "a marker unit". Also, "under environment where light is emitted to the same direction as the view of the camera 4" according to the variation corresponds to "under invisible light" according to the embodiments, and their broader concept may be also referred to as "a first illumination condition". Also, "under environmental light" according to the variation corresponds to "under visible light" according to the embodiments, and their broader concept may be also referred to as "a second illumination condition". Also, "light emitted to the same direction as the view of the camera 4" corresponds to "invisible light" according to the embodiments, and their broader concept may be also referred to as "first illumination condition light". Also, "an image including reflected light from the marker 9 at turning on the light source (reflected light image)" according to the variation corresponds to "invisible light image" according to the embodiments, and their broader concept may be also referred to as "a first image". Also, "usual environmental light at turning on the light source 24" according to the variation corresponds to "visible light" according to the embodiments, and their broader concept may be also referred to as "second illumination condition light". Also, "an image that does not including the reflected light from the marker 9 at turning on the light source 24 (environmental light image)" according to the variation corresponds to "visible light image" according to the embodiments, and their broader concept may be also referred to as "a second image".

Since the scheme of using the recursive reflective material for the light emitting unit according to the variation does not need to limit usual environmental light (for example, darkening, filtering light of a specific wavelength, or the like) compared to the scheme of using fluorescent materials for the light emitting unit according to the embodiments, "the image including reflected light from the marker 9 at turning on the light source 24" for use in model training can be more easily obtained. Accordingly, it is particularly useful in the case of outdoor implementations where it is difficult to control the environmental light, and the environments where the present embodiments can be practiced can be expanded, which can improve versatility.

The present embodiments have been described above with reference to specific examples. However, the present disclosure is not limited to the specific examples. Design matters added by those skilled in the art to the specific examples could be included in the scope of the present disclosure, as long as they include the subject matter of the present disclosure. Components and placement, condition, shape thereof or the like provided in the above-stated examples are not limited to the illustrative examples and can be changed appropriately. If technical contradiction does not arise, the components provided in the above-stated examples can be changed in combination. Furthermore, the present disclosure includes any combination of the features of the multiple embodiments as stated above.

In the above embodiments, the embodiments of ultraviolet light being emitted to acquire an image where the light emitting unit emits the light have been described, but invisible light other than the ultraviolet light may be emitted, if it can emit the light more strongly than the case where the visible light might be emitted. Note that the invisible light means a beam of a wavelength outside the visible light. Also, for example, the first and second illumination conditions may be arranged by switching on and off the invisible light that allows the light emitting unit to emit the light more strongly than under the visible light while emitting the visible light or the invisible light continuously. Then, data regarding the light emitting unit can be generated from the difference between images acquired at turning on and off the invisible light.

Also, the marker unit which is formed of recursive reflective materials or fluorescent materials as stated above is one example. Also, the first and second illumination conditions can be changed appropriately.

In the above embodiments, the capturing unit such as the camera 4 is fixed during acquisition of the first and second images, but the capturing unit may be moved during acquisition of the first and second images. In this case, the first image acquired under the first illumination condition is more displaced with the second image acquired under the second illumination condition than envisioned, and if training data is generated in such a situation, others than the portion where the marker unit is not actually provided may be processed as being the marker unit. In such a case, the images may be preferably processed to positions of the light emitting units in the two images overlapping with each other, for example, to allow the images to be considered as being captured at the same position. For example, the image processing may include parallel shift, rotation, shaping of images and so on. This processing can be achieved by means of a trained machine learning model or translation based on matching from image features without use of machine learning.

In the above embodiments, as one example of robotic operations controlled by the robotic controllers 1, 1A, 1B and 1C, picking operations to pick the target objects 20, 21 and 22 with robotic dual arms 5 have been illustratively described, but operations other than the picking operations may be applied. For example, operations other than the picking operation, such as operations on an object with suction, or robotic actions using elements other than the robotic arm 5, such as setting the position of the light emitting unit as a goal position and moving a robot to the goal position detected by the robot, may be included.

In the above embodiments, a robot has been described as one example, but the present disclosure is not limited to it. The present disclosure may be implemented as a system. The robot of the above embodiments is one example of the system.

In the above embodiments, generating a training dataset and training a learning model by means of the training dataset are successively performed, but the present disclosure is not limited to it.

In the present specification, the terminology "transparent" is not limited to being completely transparent and includes what is difficult for a human being or a capturing unit such as a camera to recognize.

Further items are disclosed below in conjunction with the above description.

(Appendix 1)

A generation method for a training dataset, comprising:
capturing, by one or more processors, a target object to which a marker unit recognizable under a first illumination condition is provided; and acquiring, by the one or more processors, a first image where the marker unit is recognizable and a second image obtained by capturing the target object under a second illumination condition.

(Appendix 2)

A model generation method, comprising:

using, by one or more processors, a first image where a marker unit provided to a target object is recognizable under a first illumination condition and a second image obtained by capturing the target object under a second illumination condition to generate a model, wherein the generated model estimates information for the marker unit from the incoming second image.

(Appendix 3)

A training data generation apparatus, comprising:

one or more memories; and one or more processors configured to:

capture a target object to which a marker unit recognizable under a first illumination condition is provided;

emit first illumination conditioned light to the target object;

emit second illumination conditioned light to the target object;

switch illumination of the first illumination conditioned light to the target object and illumination of the second illumination conditioned light to the target object at a predetermined timing; and acquire a first image in a state where the marker unit becomes recognizable by emitting the first illumination conditioned light to the target object and a second image in a state where the second illumination conditioned light is emitted to the target object.

(Appendix 4)

An inference apparatus, comprising:

one or more memories that store a model trained by using a first training image in a state where a marker unit provided to a training target object becomes recognizable by illuminating the training target object under a first illumination condition and a second training image obtained by capturing the training target object under a second illumination condition; and one or more processors configured to use the trained model to estimate information for the marker unit from a captured second image.

(Appendix 5)

A robotic controller, comprising:

one or more memories that store a model trained by using a first training image in a state where a marker unit provided to a training target object becomes recognizable by illuminating the training target object under a first illumination condition and a second training image obtained by capturing the training target object under a second illumination condition; and one or more processors configured to:

use the trained model to estimate information for the marker unit from a captured second image; and generate an operational plan for a robot from the information estimated for the marker unit and control an operation for the robot based on the operational plan.

(Appendix 6)

A robotic controller, comprising:

one or more memories; and one or more processors configured to:

capture a target object to which a marker unit recognizable under a first illumination condition is provided;

emit first illumination conditioned light to the target object;

detect the marker unit based on a first image in a state where the first illumination conditioned light is emitted to the target object; and generate an operational plan for a robot based on information for the detected marker unit.

(Appendix 7)

A model training method, comprising:

training, by one or more processors, a model by means of a first image and a second image as one pair of training data, wherein the first image is captured under a first illumination condition where a marker unit provided to a target object is recognizable and the second image is obtained by capturing the target object under a second illumination condition.

(Appendix 8)

A robot, comprising:

one or more memories that store a model trained by means of a first image and a second image as one pair of training data, wherein the first image is captured under a first illumination condition where a marker unit provided to a target object is recognizable and the second image is obtained by capturing the target object under a second illumination condition; and one or more processors configured to control an operation of the robot based on the second image in a state where second illumination conditioned light is emitted to a to-be-operated object.

(Appendix 9)

The generation method as stated above, wherein the marker unit is a light emitting unit recognizable under invisible light, and the second illumination condition is under visible light, and the first illumination condition is under invisible light emitted by the light emitting unit.

(Appendix 10)

The generation method as stated above, wherein the marker unit is a reflection unit including a recursive reflective material, and the second illumination condition is environmental light, and the first illumination condition is a condition where a capturing unit is capable of capturing reflected light from the reflection unit.

(Appendix 11)

The generation method as stated above, further comprising:

capturing, by the one or more processors, the target object to which a light emitting unit recognizable under invisible light is provided; and acquiring, by the one or more processors, a visible light image by capturing the target object under visible light and an invisible light image in a state where the light emitting unit emits light.

(Appendix 12)

The generation method as stated above, further comprising:

switching, by the one or more processors, illumination of visible light to the target object to acquire the visible light image and illumination of invisible light to the target object to acquire the invisible light image at a predetermined timing and acquire the visible light image and the invisible light image with one capturing device.

(Appendix 13)

The generation method as stated above, further comprising:

using, by the one or more processors, a visible light image obtained by capturing a target object under visible light and an invisible light image in a state where a light emitting unit that is provided to the target object and emits light under invisible light is visible to estimate information regarding the light emitting unit for the incoming visible light image.

(Appendix 14)

The training data generation apparatus as stated above, wherein the one or more processors are configured to:

capture the target object to which a light emitting unit recognizable under invisible light is provided;

emit visible light to the target object;

emit invisible light to the target object;

switch illumination of visible light to the target object and illumination of invisible light to the target object at a predetermined timing; and acquire a visible light image in a state where the visible light is emitted to the target object and an invisible light image in a state where the light emitting unit emits light by emitting the invisible light to the target object.

(Appendix 15)

The inference apparatus as stated above, wherein the one or more memories store a model trained by means of a training visible light image and a training invisible light image as training data, the training visible light image obtained by capturing a training target object under visible light, and the training invisible light image being in a state where a light emitting unit provided to the training target object and recognizable under invisible light emits light, and the one or more processors are configured to use the trained model to estimate information regarding the light emitting unit from a captured visible light image.

(Appendix 16)

The robotic controller as stated above, wherein the one or more memories store a model trained by using a training visible light image and a training invisible light image as training data, the training visible light image obtained by capturing a training target object under visible light, and the training invisible light image being in a state where a light emitting unit provided to the training target object and recognizable under invisible light, and the one or more processors are configured to use the trained model to estimate information regarding the marker unit from a captured visible light image, and the one or more processors are configured to generate an operational plan for a robot from the estimated information regarding the light emitting unit and control an operation of the robot based on the operational plan.

(Appendix 17)

The robotic apparatus as stated above, wherein the light emitting unit is a fluorescent marker provided at a picking position of the training target object, and the one or more processors are configured to:

use the trained model to estimate a position of the fluorescent marker from a visible light image captured by a capturing device and estimate the picking position of a to-be-operated object; and control an operation of the robot to grasp the picking position of the estimated to-be-operated object.

(Appendix 18)

The robotic controller as stated above, wherein the to-be-operated object is a clothing, and the one or more processors are configured to control the robot to perform a task of grasping the estimated picking position of the clothing and folding the clothing.

(Appendix 19)

The robotic controller as stated above, wherein multiple types of fluorescent markers that emit light of different colors are provided to the clothing, and the one or more processors are configured to:

estimate positional information and emitting color information for the fluorescent markers; and perform a folding operation while changing the picking position in an order configured based on the emitting color information.

(Appendix 20)

The robotic controller as stated above, wherein the light emitting unit is a fluorescent material mixed into the training target object or coated on a surface of the training target object, and the one or more processors are configured to:

use the trained model to estimate a type of a to-be-operated object from a visible light image; and control an operation of the robot corresponding to the estimated type of the to-be-operated object.

(Appendix 21)

The robotic controller as stated above, wherein the training target object is a liquid, a powdered and granular material or a gas, and the fluorescent material is mixed into the training target object at acquiring the training data.

(Appendix 22)

The robotic controller as stated above, wherein the one or more processors are configured to:

capture a target object to which a light emitting unit recognizable under invisible light is provided;

emit invisible light to the target object;

detect the light emitting unit based on an invisible light image in a state where the invisible light is emitted to the target object; and generate an operational plan for a robot based on information regarding the detected light emitting unit.

(Appendix 23)

The robotic controller as stated above, wherein the robot grasps the target object with a robotic arm, the light emitting unit is a fluorescent marker indicative of a picking position of the target object, and the one or more processors are configured to:

calculate the picking position for the target object based on a position of the fluorescent marker in the invisible light image; and control an operation of the robotic arm to grasp the calculated picking position for the target object.

(Appendix 24)

The robotic controller as stated above, wherein the light emitting unit is a fluorescent information unit that emits light upon invisible light being emitted and includes various information items associated with the target object, and the one or more processors are configured to:

read the various information items regarding the target object based on the fluorescent information unit in the invisible light image; and control an operation of the robot depending on the read various information items associated with the target object.

(Appendix 25)

The robotic controller as stated above, wherein the fluorescent information unit is a two-dimensional barcode that emits light upon invisible light being emitted.

(Appendix 26)

The model training method as stated above, wherein the model is trained by means of training data including a pair of a visible light image obtained by capturing the target object under visible light and an invisible light image obtained by capturing the target object under invisible light where a light emitting unit provided to the target object and emitting light under the invisible light becomes visible.

(Appendix 27)

The mode training method as stated above, wherein information regarding the light emitting unit can be estimated based on an incoming visible light image of a to-be-operated object.

(Appendix 28)

The robot as stated above, wherein the one or more memories store a model trained by means of training data including a pair of a visible light image obtained by capturing a target object under visible light and an invisible light image obtained by capturing the target object under invisible light where a light emitting unit provided to the target object and emitting light under the invisible light becomes visible, and the one or more processors are configured to control an operation of the robot based on a visible light image in a state where visible light is emitted to a to-be-operated object.

(Appendix 29)

The generation method as stated above, further comprising:

capturing, by the one or more processors, a target object to which a reflection unit including a recursive reflective material reflecting light rays to a capturing device under an environment where the light rays are emitted to the same direction as a view of the capturing device is provided; and acquiring, by the one or more processors, an environmental light image obtained by capturing the target object under environmental light and a reflected light image including the reflected light from the reflection unit.

(Appendix 30)

The generation method as stated above, further comprising:

switching, by the one or more processors, the light source for emitting light to the target object on and off to acquire the reflected light image and to acquire the environmental light image, respectively, to acquire the reflected light image and the environmental light image with one capturing device.

(Appendix 31)

The generation method as stated above, further comprising:

using, by the one or more processors, an environmental light image obtained by capturing a target object under environmental light and a reflected light image where a reflection unit provided to the target object and including a recursive reflective material reflecting light rays to a capturing device under an environment of the light being emitted to the same direction as a view of the capturing device is visible to estimate information regarding the reflection unit for the incoming environmental light image.

(Appendix 32)

The training data generation apparatus as stated above, further comprising:

a capturing device that captures a target object;

a reflection unit that is provided to the target object and includes a recursive reflective material reflecting light rays to the capturing device under an environment where light is emitted to the same direction as a view of the capturing device; and a light source that emits the light to the target object, wherein the one or more processors are configured to:

switch the light source on and off at a predetermined timing; and acquire a reflected light image in a state where the reflection unit emits light by switching the light source on to illuminate the target object with light of the same direction as the view of the capturing device from the light source and an environmental light image in a state where the light source is turned off to emit environmental light to the target object.

(Appendix 33)

The inference apparatus as stated above, wherein the one or more memories store a model trained by means of training data including a training environmental light image obtained by capturing a training target object under environmental light and a training reflected light image in a state where a reflection unit provided to the training target object and including a recursive reflective material reflecting light rays to a capturing device under an environment where light is emitted to the same direction as a view of the capturing device emits the light, and the one or more processors are configured to use the trained model to estimate information regarding the reflection unit from an environmental light image captured by the capturing device.

(Appendix 34)

The robotic controller as stated above, wherein the one or more memories store a model trained by means of training data including a training environmental light image obtained by capturing a training target under environmental light and a training reflected light image in a state where a reflection unit provided to the training target object and including a recursive reflective material reflecting light rays to a capturing device under an environment of the light being emitted to the same direction as a view of the capturing device emits the light, and the one or more processors are configured to:

use the trained model to estimate information regarding the reflection unit from an environmental light image captured by a capturing device; and generate an operational plan of a robot corresponding to estimated information of the reflection unit and control an operation of the robot based on the operational plan.

(Appendix 35)

The robotic controller as stated above, further comprising:

a capturing device that captures a target object; and a reflection unit provided to the target object and including a recursive reflective material reflecting light rays to the capturing device under an environment where the light rays are emitted to the same direction as a view of the capturing device, wherein the one or more processors are configured to:

detect the reflection unit based on a reflected light image in a state where the light rays are emitted to the target object; and generate an operational plan of a robot based on information regarding the detected reflection unit.

(Appendix 36)

The model generation method as stated above, wherein the model is trained by means of training data including a pair of an environmental light image obtained by capturing a target object in environmental light and a reflected light image obtained by capturing the target object in an environment where a reflection unit provided to the target object and including a recursive reflective material reflecting light rays to a capturing device under an environment of the light rays being reflected to the same direction as a view of the capturing device is visible.

(Appendix 37)

The robot as stated above, wherein the one or more memories store a mode trained by means of training data including a pair of an environmental light image obtained by capturing a target object in environmental light and a reflected light image obtained by capturing the target object in an environment where a reflection unit provided to the target object and including a recursive reflective material reflecting light rays to a capturing device under an environment of the light rays being reflected to the same direction as a view of the capturing device is visible, and the one or more processors are configured to control an operation of the robot based on the environmental light image obtained by capturing a to-be-operated object under environmental light.

The present disclosure is not limited to the above-stated specific embodiments, and various variations and modifications can be made without deviating from the scope of claims.

What is claimed is:

1. A generation method for a training dataset, comprising:
   acquiring, by one or more processors, a first image by capturing, under a first illumination condition, a target object to which a marker is provided; and
   acquiring, by the one or more processor, a second image by capturing the target object under a second illumination condition,
   wherein the marker is recognizable under invisible light, the second illumination condition is under visible light, and the first illumination condition is under invisible light.

2. The generation method as claimed in claim 1, wherein the marker seems different under the first illumination condition and the second illumination condition.

3. The generation method as claimed in claim 1, wherein the target object is amorphous or transparent.

4. The generation method as claimed in claim 1, wherein the target object is a clothing, a liquid or a powder.

5. The generation method as claimed in claim 1, wherein the marker is a fluorescent marker.

6. The generation method as claimed in claim 1, wherein the marker emits light under the first illumination condition.

7. A training data generation system, comprising:
   one or more memories; and
   one or more processors configured to:
   emit first illumination conditioned light to a target object to which a marker is provided;
   emit second illumination conditioned light to the target object;
   switch between illumination of the first illumination conditioned light to the target object and illumination of the second illumination conditioned light to the target object;
   acquire a first image by capturing the target object in a state where the marker becomes recognizable by emitting the first illumination conditioned light to the target object; and
   acquire a second image by capturing the target object in a state where the second illumination conditioned light is emitted to the target object,
   wherein the marker is recognizable under invisible light, the second illumination conditioned light is visible light, and the first illumination conditioned light is invisible light.

8. The training data generation system as claimed in claim 7, wherein the target object is amorphous or transparent.

9. The training data generation system as claimed in claim 7, wherein the target object is a clothing, a liquid or a powder.

10. The training data generation system as claimed in claim 7, wherein the marker is a fluorescent marker.

11. The training data generation system as claimed in claim 7, wherein the marker emits light under the first illumination condition.

12. A robot, comprising:
   one or more memories that store a model trained in accordance with a model generation method including using a first image obtained by capturing, under a first illumination condition, a target object to which a marker recognizable under the first illumination condition is provided, and a second image obtained by capturing the target object under a second illumination condition to generate the model the model; and
   one or more processors configured to control an operation of the robot in a state where second illumination conditioned light is emitted to a to-be-operated object.

13. The robot as claimed in claim 12, wherein the to-be-operated object is amorphous or transparent.

14. The robot as claimed in claim 12, wherein the to-be-operated object is a clothing, a liquid or a powder.

15. The robot as claimed in claim 12, wherein the marker is a fluorescent marker.

16. A generation method for a training dataset, comprising:
   acquiring, by one or more processors, a first image by capturing, under a first illumination conditioned light, a target object to which a marker recognizable under the first illumination conditioned light is provided; and
   acquiring, by the one or more processors, a second image by capturing the target object under a second illumination conditioned light,
   wherein the marker includes a recursive reflective material, the second illumination conditioned light is environmental light, and reflected light from the marker is captured under the first illumination conditioned light.

17. The generation method as claimed in claim 16, wherein the target object is amorphous or transparent.

18. The generation method as claimed in claim 16, wherein the target object is a clothing, a liquid or a powder.

19. The generation method as claimed in claim 16, wherein the marker is a fluorescent marker.

20. A training data generation system, comprising:
   one or more memories; and
   one or more processors configured to:
   emit first illumination conditioned light to a target object to which a marker is provided;
   emit second illumination conditioned light to the target object;
   switch between illumination of the first illumination conditioned light to the target object and illumination of the second illumination conditioned light to the target object;
   acquire a first image by capturing the target object in a state where the marker becomes recognizable by emitting the first illumination conditioned light to the target object; and
   acquire a second image by capturing the target object in a state where the second illumination conditioned light is emitted to the target object,
   wherein the marker includes a recursive reflective material, and the second illumination conditioned light is environmental light, and reflected light from the marker is captured under the first illumination conditioned light.

* * * * *